United States Patent
Ahn et al.

(10) Patent No.: US 7,471,357 B2
(45) Date of Patent: Dec. 30, 2008

(54) LIQUID CRYSTAL DISPLAY DEVICE AND METHOD FOR FABRICATING THE SAME

(75) Inventors: Byung Chul Ahn, Ahnyang-shi (KR); Joo Soo Lim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 389 days.

(21) Appl. No.: 11/315,151

(22) Filed: Dec. 23, 2005

(65) Prior Publication Data

US 2006/0139525 A1 Jun. 29, 2006

(30) Foreign Application Priority Data

Dec. 24, 2004 (KR) .................. 10-2004-0112580

(51) Int. Cl.
*G02F 1/1335* (2006.01)
*G02F 1/13* (2006.01)
(52) U.S. Cl. .............. 349/114; 349/113; 349/126; 349/139; 349/187
(58) Field of Classification Search ........ 349/114, 349/113, 126, 139, 143, 144, 146, 187, 190, 349/191, 193
See application file for complete search history.

(56) References Cited

U.S. PATENT DOCUMENTS

| | | | | |
|---|---|---|---|---|
| 6,738,109 | B2 * | 5/2004 | Jeon ........................... 349/43 |
| 7,342,622 | B2 * | 3/2008 | Yang et al. .................. 349/113 |
| 2003/0086036 | A1 * | 5/2003 | Yang et al. .................. 349/113 |
| 2006/0139525 | A1 * | 6/2006 | Ahn et al. .................... 349/114 |

* cited by examiner

*Primary Examiner*—Brian M Healy
(74) *Attorney, Agent, or Firm*—McKenna Long & Aldridge LLP

(57) ABSTRACT

This invention relates to a transflective thin film transistor substrate and a fabricating method thereof that is adaptive for simplifying process, and a liquid crystal display device using the same and a fabricating method thereof.

A liquid crystal display device according to an embodiment of the present invention includes a gate line and a data line crossing each other with a gate insulating film to define a pixel area on a first substrate; a thin film transistor connected to the gate line and the data line; a pixel electrode in the pixel area connected to the thin film transistor and to be exposed through a transmission area; a reflection electrode formed in a reflection area having separated areas with the transmission area in between; and an organic insulating film formed under the reflection electrode and formed in a first horizontal area including the reflection area.

24 Claims, 23 Drawing Sheets

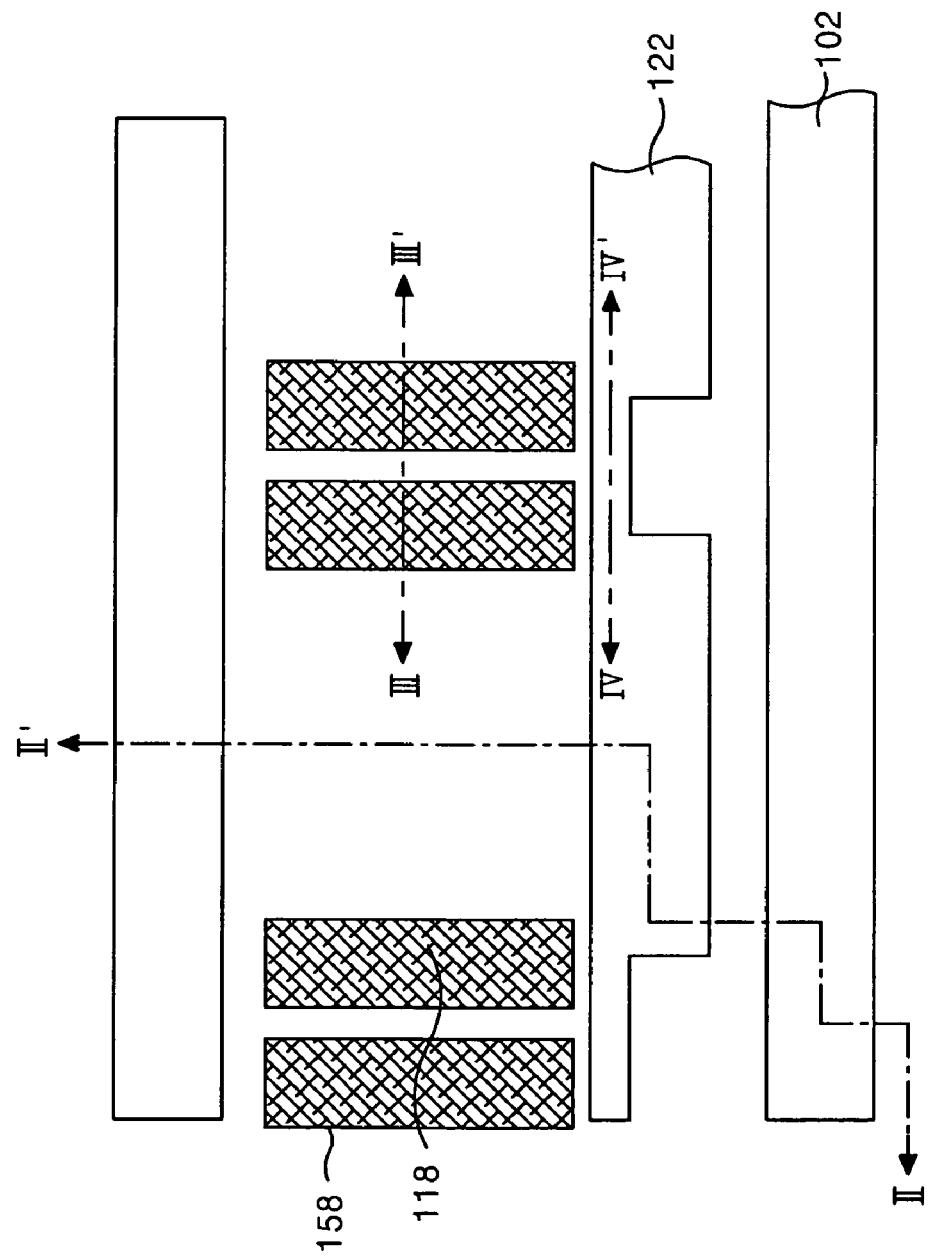

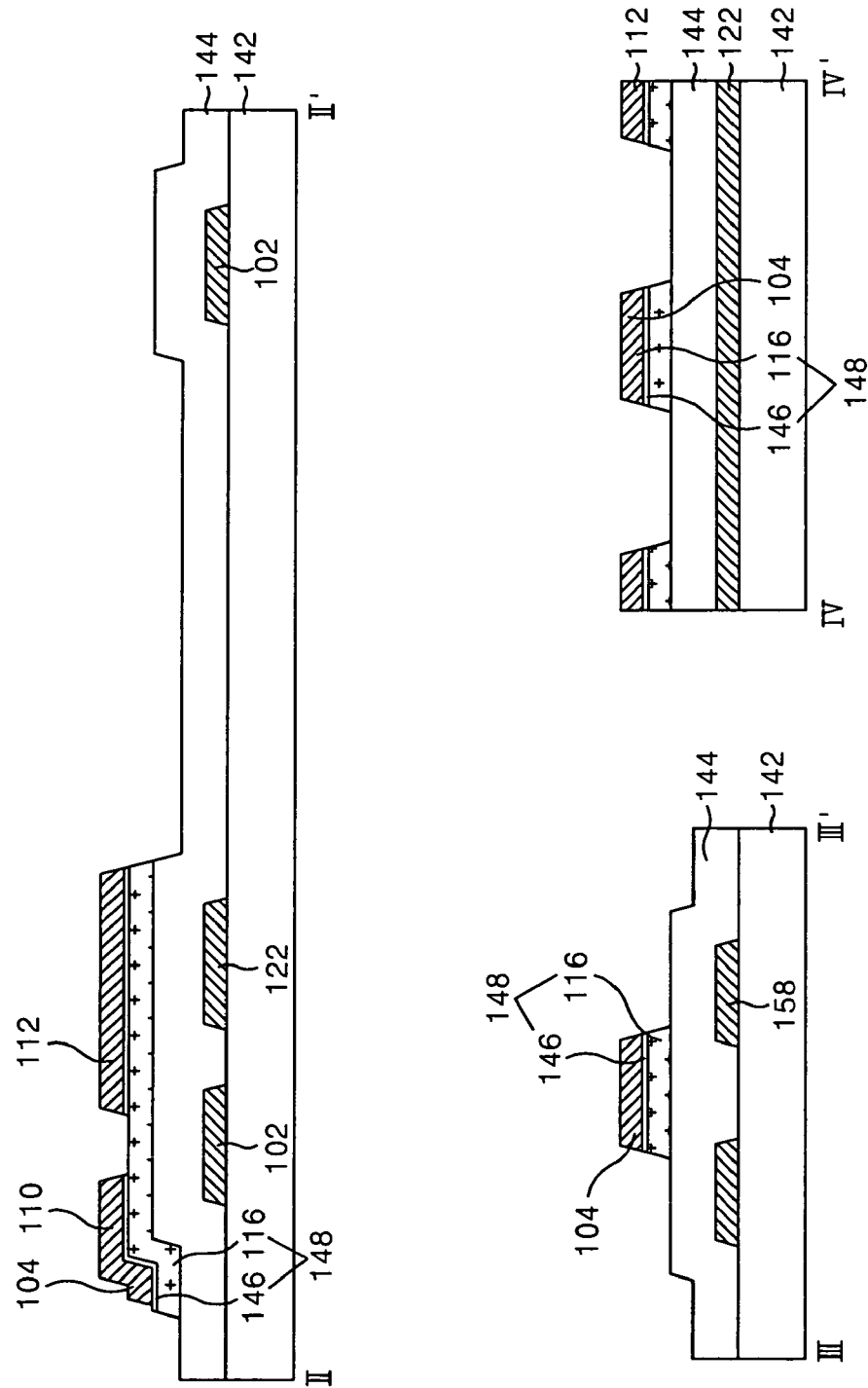

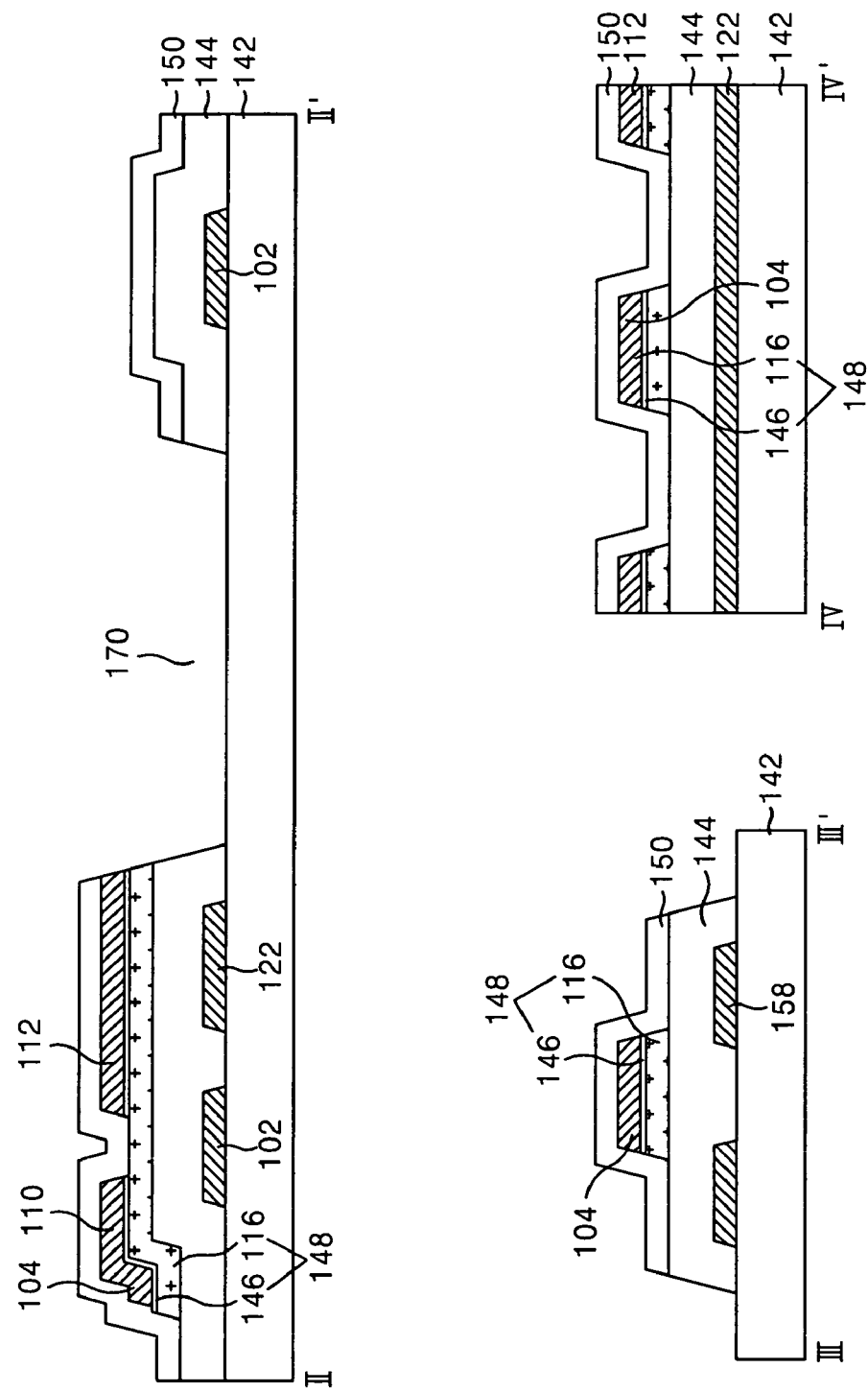

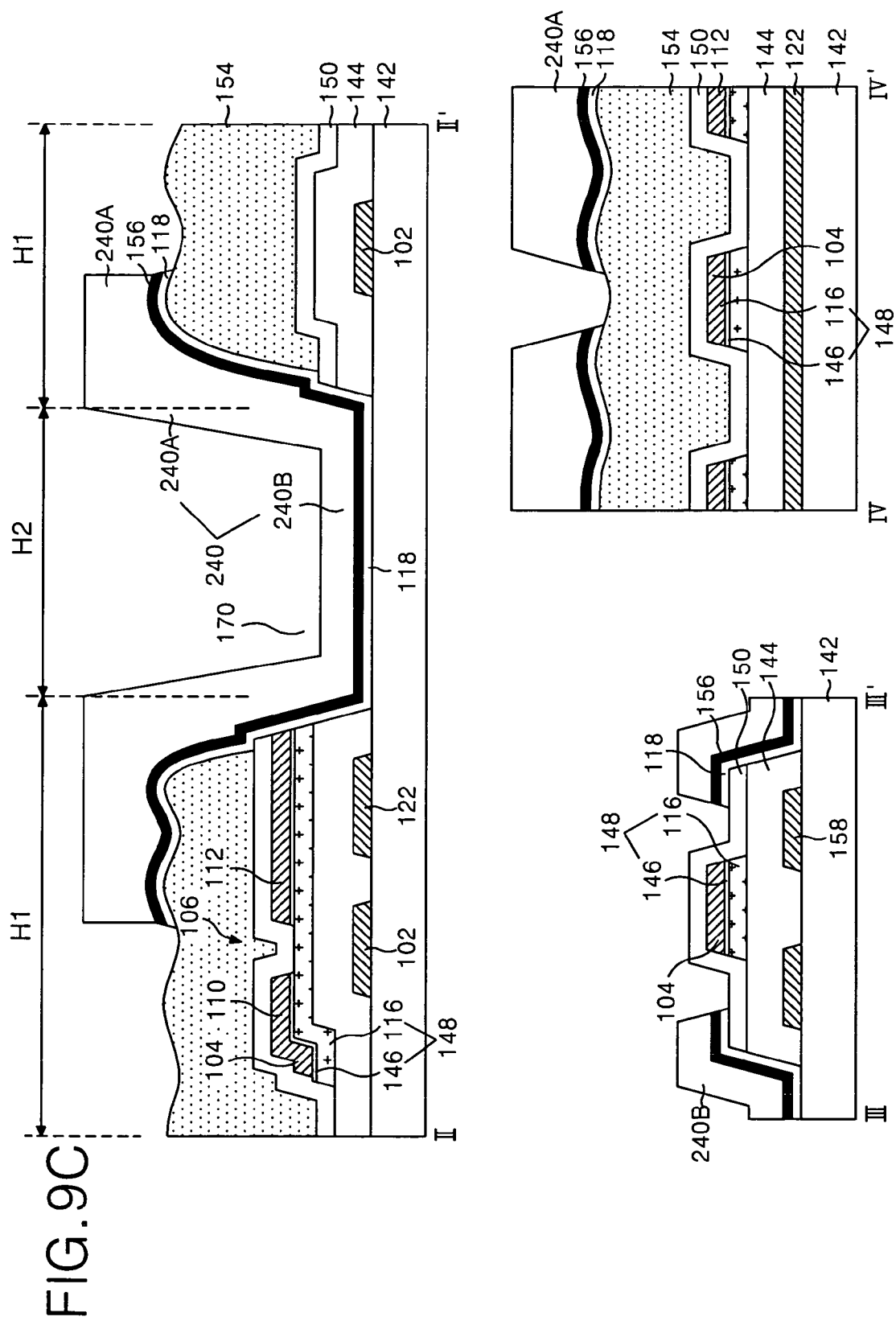

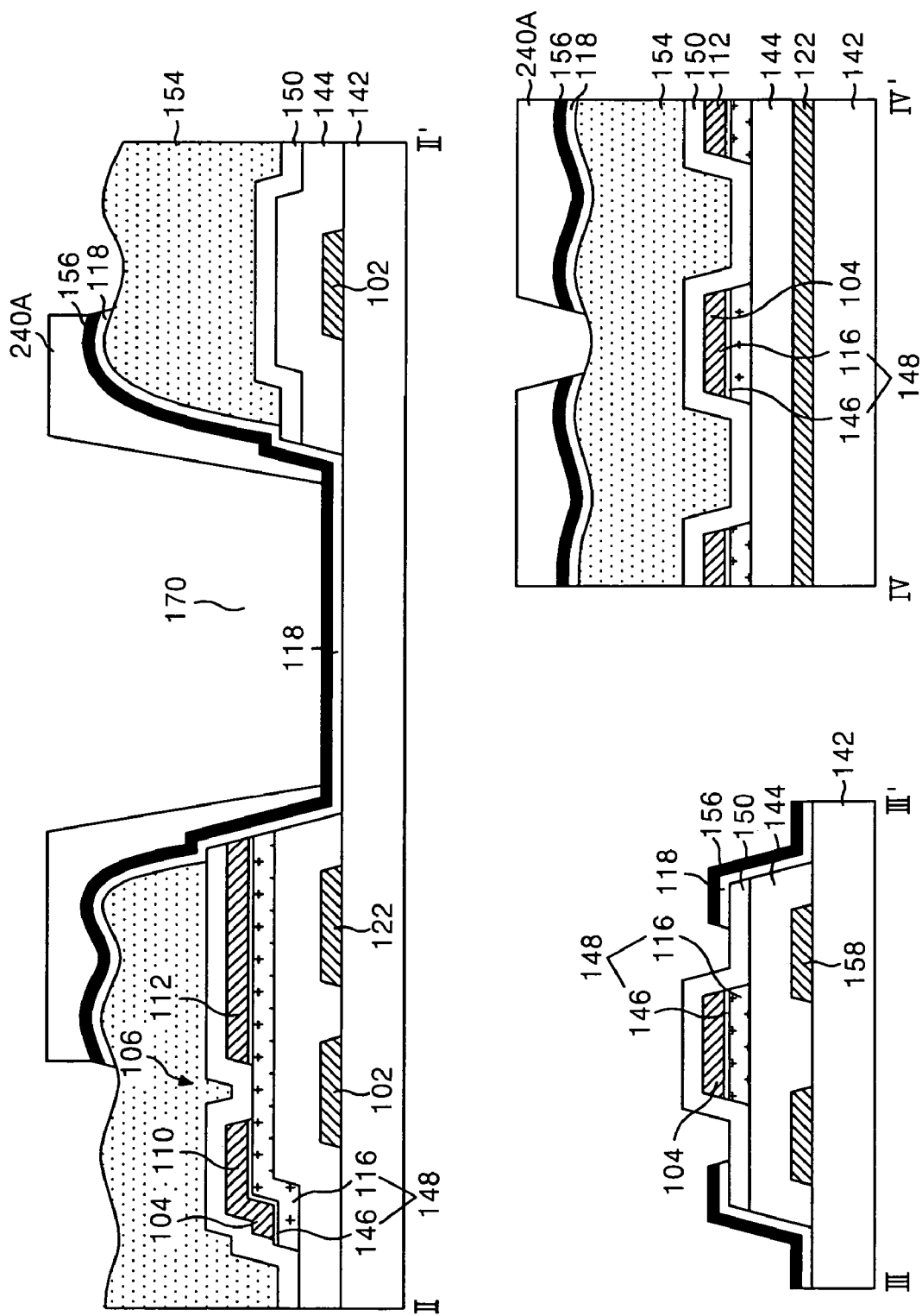

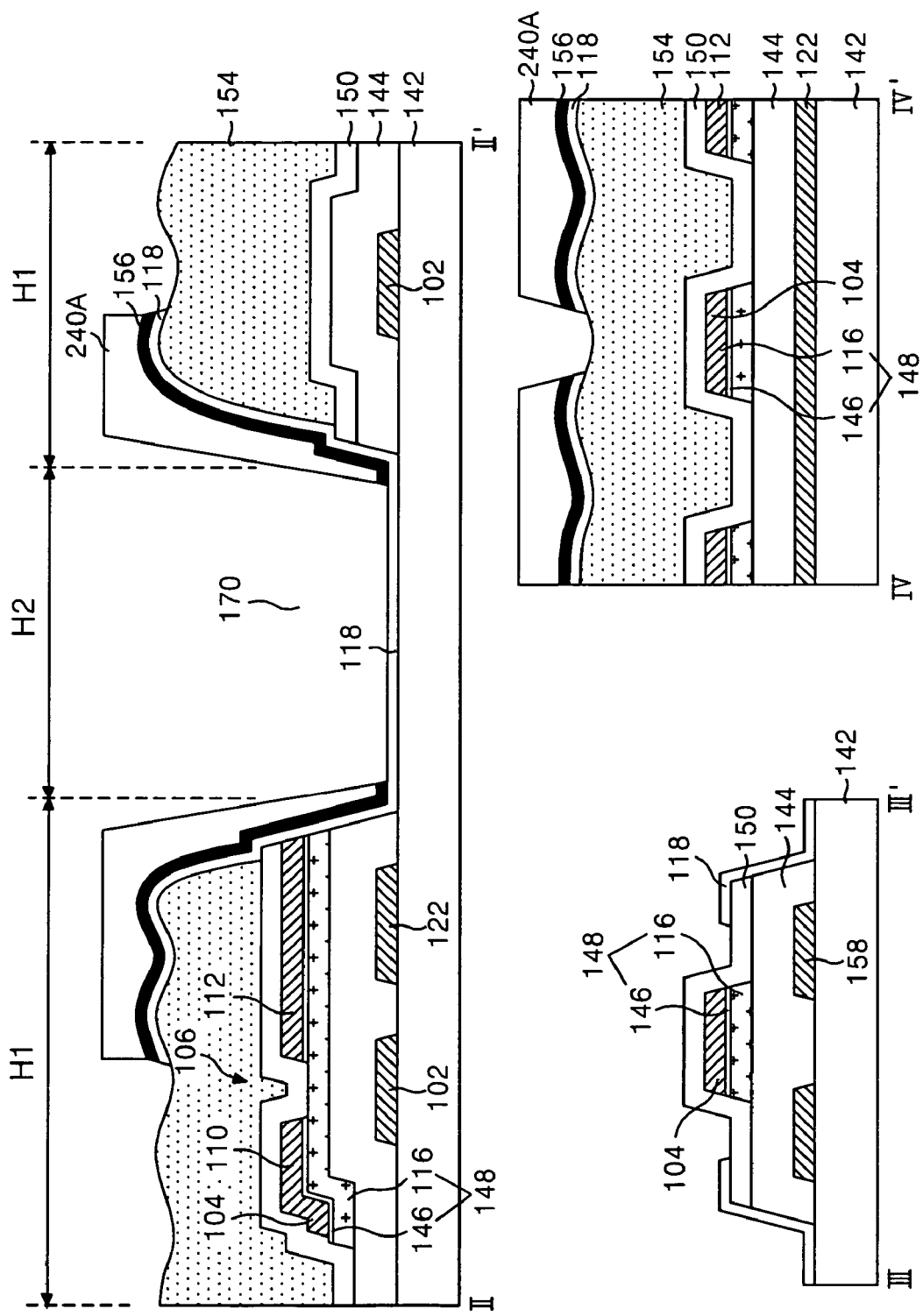

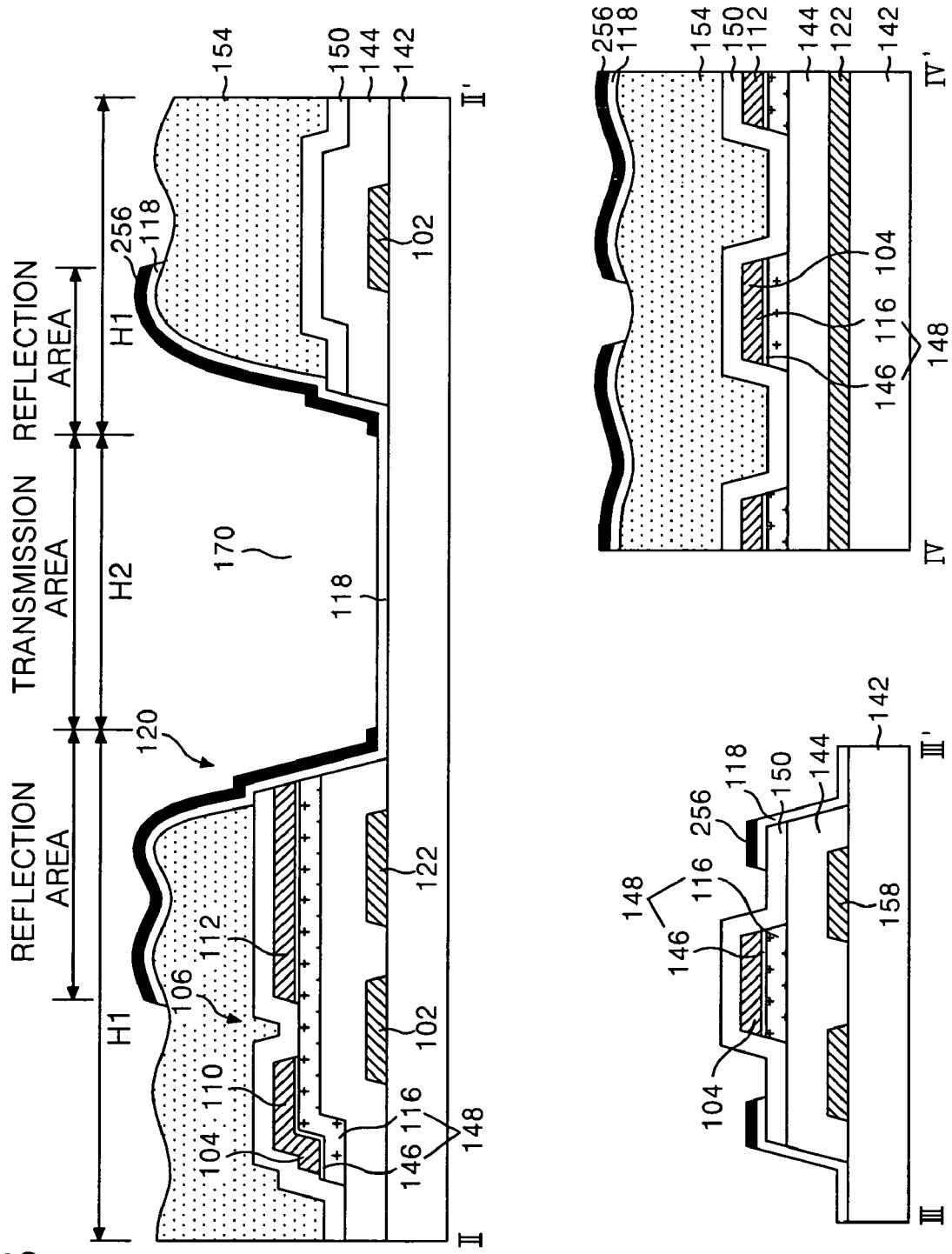

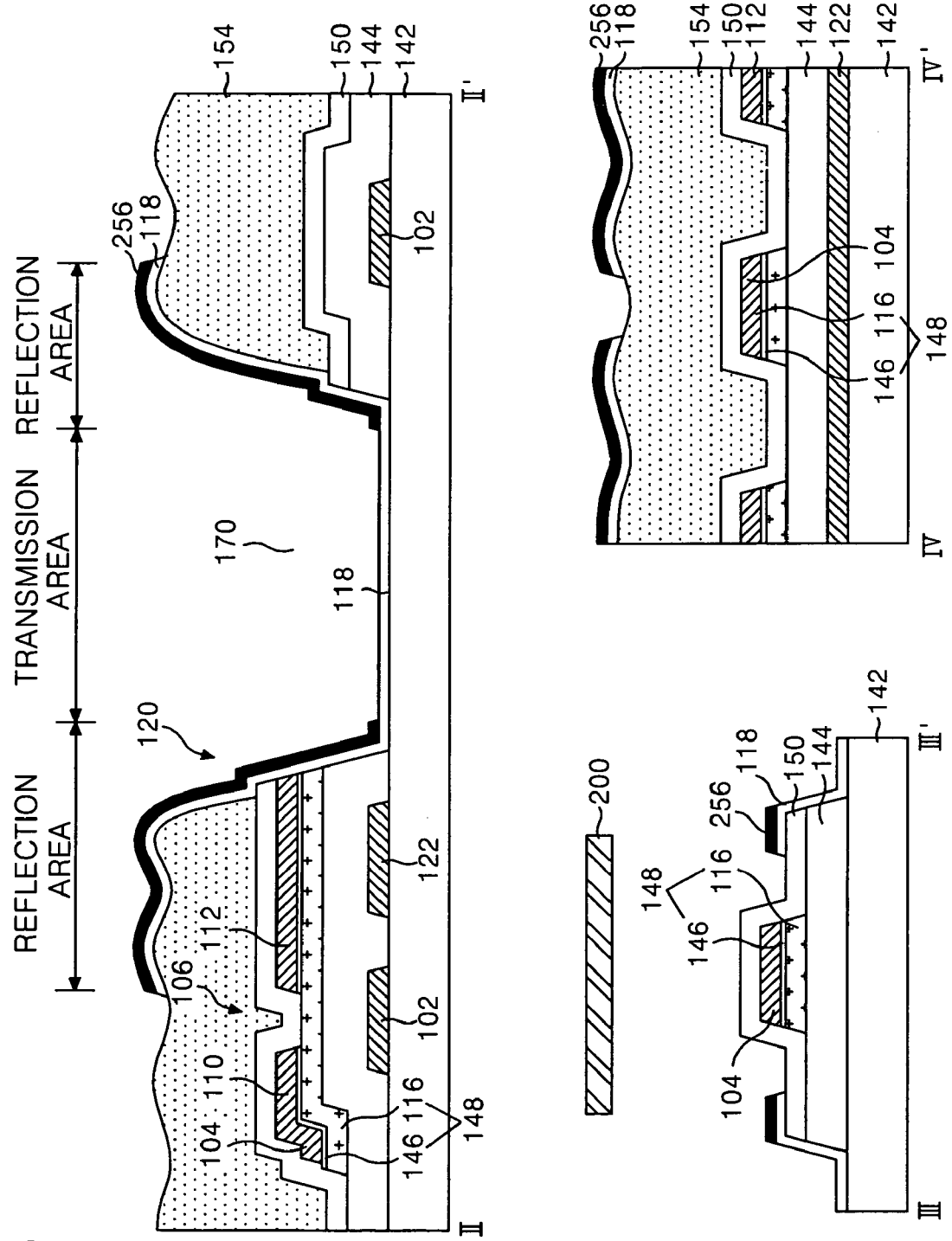

LIQUID CRYSTAL DISPLAY DEVICE AND METHOD FOR FABRICATING THE SAME

This application claims the benefit of Korean Patent Application No. P04-112580, filed on Dec. 24, 2004, which is hereby incorporated by reference for all purposes as if fully set forth herein.

BACKGROUND OF THE INVENTION

1. Field of the Invention

The present invention relates to a transflective type liquid crystal display device, and more particularly to a transflective thin film transistor substrate and a fabricating method thereof that simplifies the fabrication process, and a liquid crystal display panel using the same and a fabricating method thereof.

2. Description of the Related Art

A liquid crystal display device controls the light transmittance of a liquid crystal that has dielectric anisotropy by use of an electric field, thereby displaying a picture. The liquid crystal display device includes a liquid crystal display panel for displaying a picture through a liquid crystal cell matrix and a drive circuit for driving the liquid crystal display panel.

Referring to FIG. 1, a liquid crystal display panel of the related art includes a color filter substrate 10 and a thin film transistor substrate 20 that are bonded together with a liquid crystal 24 therebetween.

The color filter substrate 10 includes a black matrix 4, a color filter 6, and a common electrode 8 that are sequentially formed on an upper glass substrate 2. The black matrix 4 is formed in a matrix shape on the upper glass substrate 2. The black matrix 4 divides an area of the upper glass substrate 2 into a plurality of cell areas where the color filters are to be formed, and the black matrix 4 prevents light interference between adjacent cells and an external light reflection. The color filter 6 is divided into red R, green G, and blue B in the cell areas divided by the black matrix 4. The common electrode 8 formed of a transparent conductive layer on the entire surface of the color filter 6 supplies a common voltage Vcom or a reference voltage when driving a liquid crystal 24. Also, an overcoat layer (not shown) might be further formed between the color filter 6 and the common electrode 8 to level the color filter 6.

The thin film transistor substrate 20 includes a thin film transistor 18 and a pixel electrode 22 that are formed at each cell area defined by the crossing of a gate line 14 and a data line 16 on a lower glass substrate 12. The thin film transistor 18 supplies a data signal from the data line 16 to the pixel electrode 22 in response to a gate signal of the gate line 14. The pixel electrode 22 formed of the transparent conductive layer supplies the data signal from the thin film transistor 18 to drive the liquid crystal 24.

The liquid crystal 24 having dielectric anisotropy controls a light transmittance by rotating in accordance with an electric field formed by the data signal on the pixel electrode 22 and the common voltage Vcom on the common electrode 8.

The liquid crystal display panel further includes a spacer (not shown) for uniformly maintaining a cell gap between the color filter substrate 10 and the thin film transistor substrate 20. A ball spacer or column spacer may be used as the spacer.

The color filter substrate 10 and the thin film transistor substrate 20 of the liquid crystal display panel are formed using a plurality of mask processes. One mask process includes many processes such as thin film depositing (coating), cleaning, photolithography, etching, photo-resist stripping, inspecting, etc. Specifically, the thin film transistor substrate is manufactured using a semiconductor process and requires a plurality of mask processes, thus its fabricating process is complicated is a major contributor to the manufacturing cost of the liquid crystal display panel.

Further, the liquid crystal display panels are divided into three different types: a transmission type that displays a picture by use of a light incident from a backlight unit; a reflection type that displays a picture by reflecting an external light such as a natural light; and a transflective type that combines the transmission type and the reflection type.

There is a problem in that the transmission type display consumes too much power due to the backlight unit and the reflection type display cannot display a picture in a dark environment because the reflection type depends on the external light. But the transflective type display operates in a reflection mode if the external light is sufficient and in a transmission mode using the backlight unit if the external light is not sufficient, thus the electric power consumption may be reduced versus than in the transmission type display and the transflective type display is not dependent on external light like the reflection type.

To this end, the transflective type liquid crystal display panel has each pixel divided into a reflection area and a transmission area. Accordingly, the transflective thin film transistor substrate should further include a reflection electrode formed in the reflection area, and an organic insulating film formed to be relatively thick under the reflection electrode in order to equalize a light path length of the reflection area to that of the transmission area. As a result, the related art transflective thin film transistor substrate has a problem in that its fabricating process is complicated because of the number of mask processes.

Further, the related art transflective thin film transistor substrate has a transmission hole that penetrates a thick insulating film in the transmission area, thus light leakage is generated by a rubbing defect caused by a step difference between the reflection area and the transmission area. As a result, the contrast ratio is decreased.

In addition, the related art transflective thin film transistor substrate has the reflection electrode overlap the data line in order to prevent light leakage at both sides of the data line. Because of this, a parasitic capacitance is generated between the reflection electrode and the data line that causes problems such as vertical cross talk, power consumption increase, etc.

SUMMARY OF THE INVENTION

Accordingly, the present invention is directed a transflective thin film transistor substrate and a fabricating method thereof that substantially obviates one or more of the problems due to limitations and disadvantages of the related art.

An advantage of the present invention is to provide a transflective thin film transistor substrate and a fabricating method thereof that simplifies the fabrication process, and a liquid crystal display panel using the same and a fabricating method thereof.

Another advantage of the present invention is to provide a transflective thin film transistor substrate and a fabricating method thereof that prevents a rubbing defect, and a liquid crystal display panel using the same and a fabricating method thereof.

Another advantage of the present invention is to provide a transflective thin film transistor substrate and a fabricating method thereof that reduces a parasitic capacitor, and a liquid crystal display panel using the same and a fabricating method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device, including: a gate line and a data line crossing each other with a gate insulating film in between to define a pixel area on a first substrate; a thin film transistor connected to the gate line and the data line; a pixel electrode in the pixel area connected to the thin film transistor and exposed through a transmission area; a reflection electrode formed in a reflection area having separate areas with the transmission area in between; and an organic insulating film formed under the reflection electrode and formed in a first horizontal area including the reflection area.

In another aspect of the present invention, a liquid crystal display device, including: first and second substrates having a reflection area and a transmission area; a liquid crystal layer formed in a cell gap between the first and second substrates, and wherein the cell gap includes: a first cell gap in the reflection area different from a second cell gap in the transmission area, and wherein a rubbing direction of an alignment film on at least one of the first and second substrates is formed in the same direction in the first and second cell gaps.

In another aspect of the present invention, a method of fabricating a liquid crystal display device, including: forming a gate line crossing a data line with a gate insulating film in between to define a pixel area, and a thin film transistor connected to the gate line and the data line on a first substrate; forming an organic insulating film in first horizontal areas on a first substrate; forming a pixel electrode connected to the thin film transistor and overlapping a part of the organic insulating film through a transmission area having a second horizontal area between the first horizontal areas; and forming a reflection electrode overlapping the pixel electrode on the organic insulating film.

In another aspect of the present invention, a method of fabricating a liquid crystal display device, including: forming a gate line on a first substrate; forming a gate insulating film on the gate line, a semiconductor pattern on the gate insulating film, a data line on the semiconductor pattern to cross the gate line to define a pixel area, a source electrode connected to the data line, and a drain electrode facing the source electrode; forming a passivation film on the data line, the source electrode, and the drain electrode and having a transmission hole exposing the drain electrode in the pixel area; forming an organic insulating film in first horizontal areas separated by the transmission hole; forming a pixel electrode that goes through the transmission hole and overlaps a part of the organic insulating film; and forming a reflection electrode that overlaps the pixel electrode on the organic insulating film and defines a reflection electrode.

In another aspect of the present invention, a method of fabricating a liquid crystal display device, including: providing first and second substrates having a reflection area and a transmission area; bonding first and second substrates with first and second cell gaps therebetween and having a liquid crystal layer in between, wherein the first cell gap in the reflection area is different from the second cell gap in the transmission area, and wherein a rubbing direction of an alignment film on at least one of the first and second substrates is formed in the same direction in the first and second cell gaps.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 4A and 4B are a plan view and a cross sectional view for explaining a first mask process of the transflective thin film transistor substrate according to the embodiment of the present invention;

FIGS. 5A and 5B are a plan view and a cross sectional view for explaining a second mask process of the transflective thin film transistor substrate according to the embodiment of the present invention;

FIGS. 6A and 6B are a plan view and a cross sectional view for explaining a third mask process of the transflective thin film transistor substrate according to the embodiment of the present invention;

FIGS. 10A and 10B are a plan view and a cross sectional view illustrating a transflective thin film transistor substrate according to a second embodiment of the present invention; and FIGS. 11A and 11B are a plan view and a cross sectional view illustrating a transflective thin film transistor substrate and a black matrix of a color filter substrate overlapping thereon according to a third embodiment of the present invention.

DETAILED DESCRIPTION OF THE PREFERRED EMBODIMENT

Reference will now be made in detail to the preferred embodiments of the present invention, examples of which are illustrated in the accompanying drawings.

With reference to FIGS. 2 to 11B, embodiments of the present invention will be explained as follows.

Figure 1:
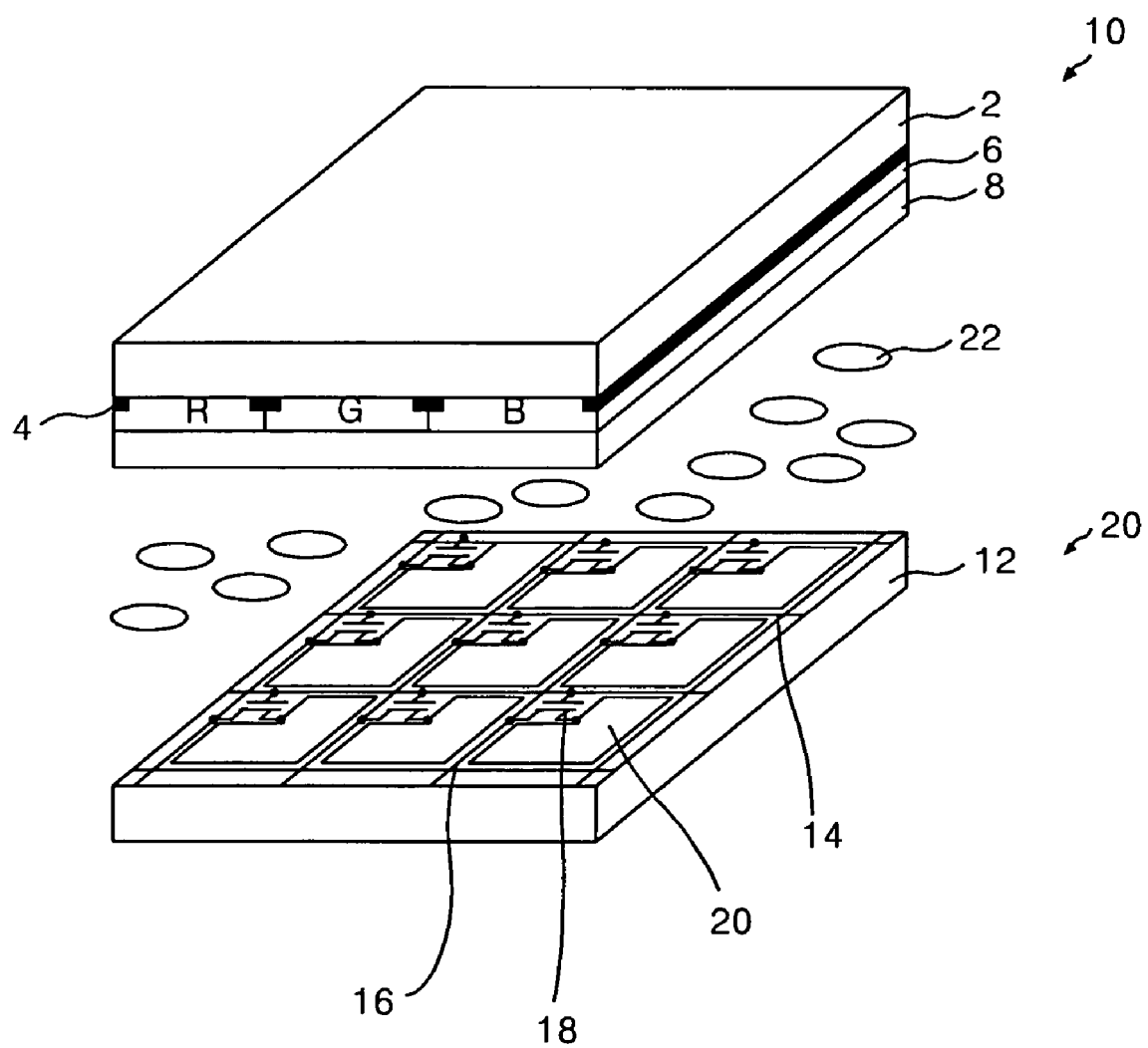
FIG. 1 is a perspective view briefly illustrating a liquid crystal display panel structure of the related art.
Figure 2:
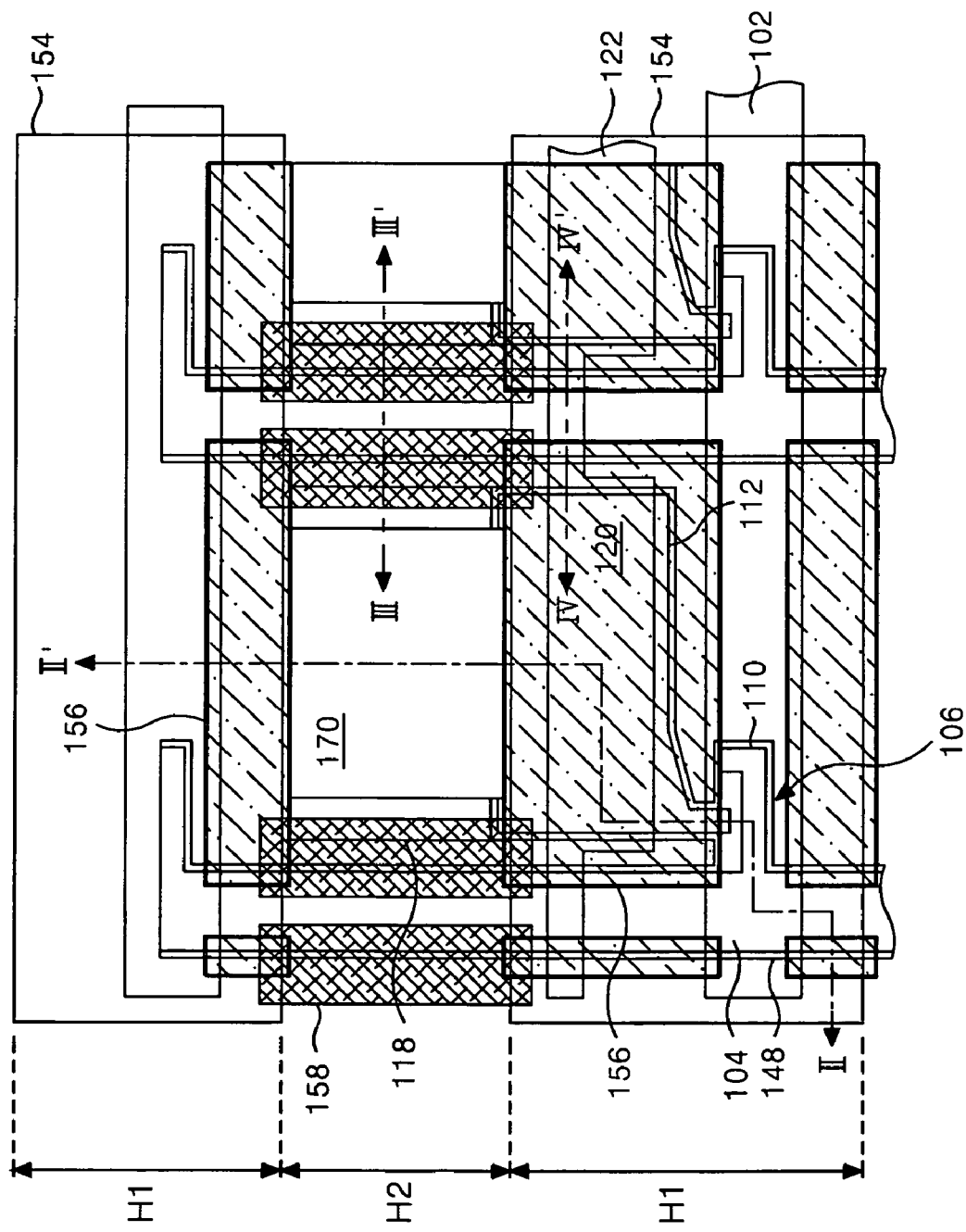
FIG. 2 is a plan view illustrating a part of a transflective thin film transistor substrate according to an embodiment of the present invention.
Figure 3:
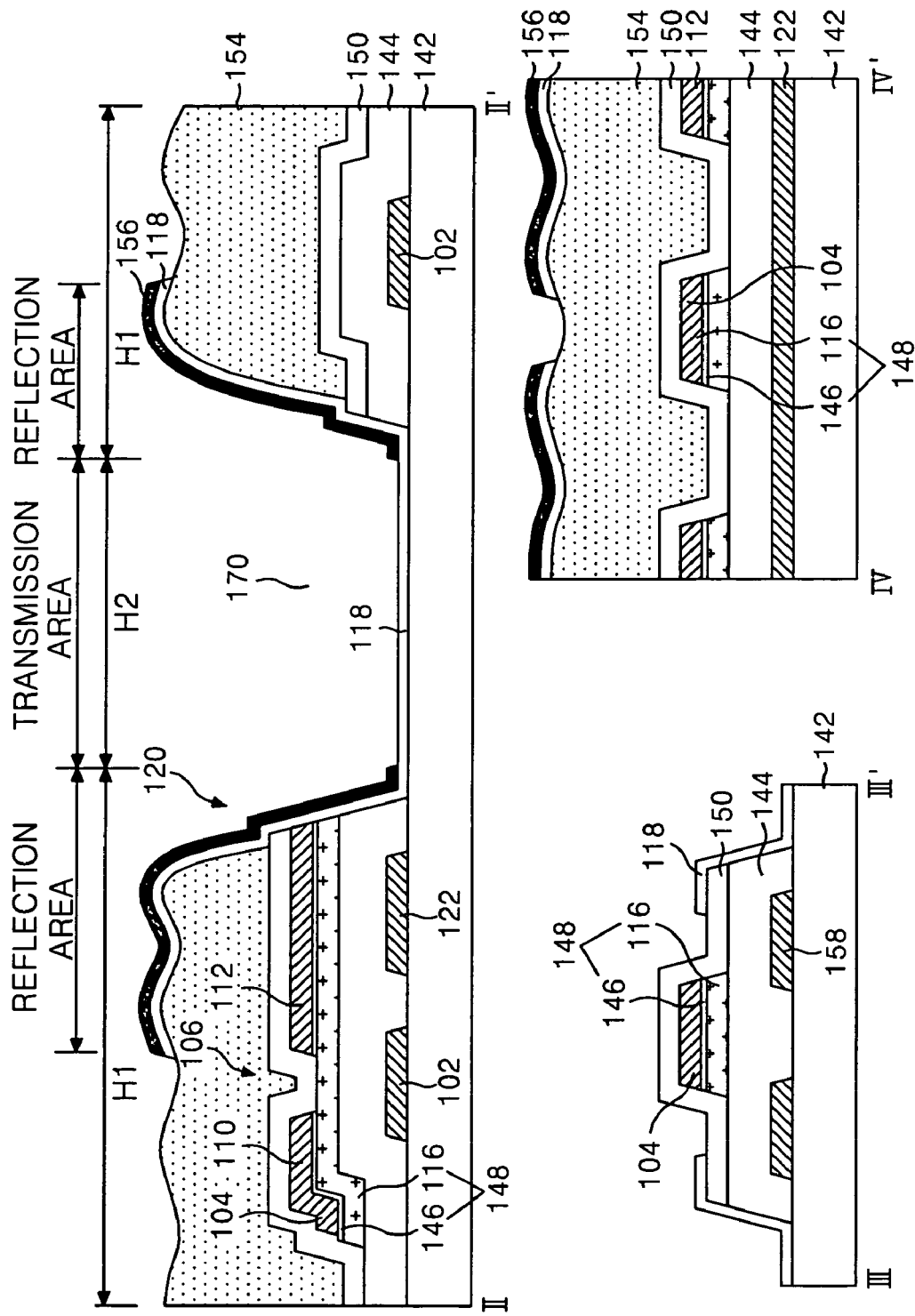
FIG. 3 is a cross sectional view illustrating the transflective thin film transistor substrate shown in FIG. 2, taken along the line II-II', III-III', IV-IV'.

FIG. 2 is a plan view illustrating a transflective thin film transistor substrate according to a first embodiment of the present invention. FIG. 3 is a cross sectional view illustrating the transflective thin film transistor substrate shown in FIG. 2, taken along the lines II-II', III-III', IV-IV'.

The transflective thin film transistor substrate shown in FIGS. 2 and 3 includes a gate line 102 and a data line 104 that are formed on a lower substrate 142 crossing each other with a gate insulating film 144 in between to define a pixel area; a thin film transistor 106 connected to the gate line 102 and the data line 104; a pixel electrode 118 in each pixel area to be connected to the thin film transistor 106; and a reflection electrode 156 formed in a reflection area of each pixel to overlap the pixel electrode 118. Accordingly, each pixel area is divided into a reflection area where the reflection electrode 156 and the pixel electrode 118 are formed and a transmission area where the pixel electrode 118 is exposed through an aperture area of the reflection electrode 156.

The thin film transistor 106 applies a pixel signal supplied on the data line 104 to the pixel electrode 118 in response to a scan signal supplied to the gate line 102. The thin film transistor 106 includes: a gate line 102; a source electrode 110 connected to the data line 104; a drain electrode 112 that faces the source electrode 110 and is connected to the pixel electrode 118; an active layer 116 that overlaps the gate line 102 with a gate insulating film 144 in between to form a channel between the source electrode 110 and the drain electrode 112; and an ohmic contact layer 146 formed on the active layer 116 except in the channel area for providing an ohmic contact between the active layer 116 and the source electrode 110 and the drain electrode 112.

A semiconductor pattern 148 having the active layer 116 and the ohmic contact layer 146 is formed to overlap the data line 104.

A passivation film 150 is formed on the gate insulating film 144 to cover the data line 104 and the thin film transistor 106, and a transmission hole 170 penetrating from the passivation film 150 to the gate insulating film 144 is formed within the pixel area. The transmission hole 170 exposes a side surface of the drain electrode 112, that extends from the thin film transistor 106, together with the semiconductor pattern 148 thereunder.

An organic insulating film 154 is formed in a horizontal direction in the reflection area, where the reflection electrode 156 is formed along the gate line 102, with the transmission area in between. In other words, the organic insulating film 154 is formed in a first horizontal area H1 that extends through the reflection area where the gate line 102 and the reflection electrode 156 that overlaps upper and lower sides of the gate line 102 are formed. The first horizontal area H1 where the organic insulating film 154 is formed is separated from a second horizontal area H2 that extends through the transmission area across the data line 104. The organic insulating film 154 causes the reflection area of the first horizontal area H1 and the transmission area of the second horizontal area H2 to have a step difference as much as the thickness of the organic insulating film 154. Accordingly, the length of the light path passing through a liquid crystal layer in the reflection area becomes equal to the light path in the transmission area, thus the transmission efficiency of the reflection mode becomes the same as that of the transmission mode. Specifically, in the transflective type liquid crystal display panel where the thin film transistor substrate shown in FIGS. 2 and 3 is bonded to the color filter substrate with the liquid crystal in between, a path that ambient light incident to the reflection area passes through the liquid crystal layer to the reflection electrode 156 back to the liquid crystal layer within the liquid crystal layer is the same in length as a path that transmitted light from the backlight unit incident to the transmission area passes through the liquid crystal layer, thus the transmission efficiency of the reflection mode is the same as that of the transmission mode. Also, the organic insulating film 154 is formed to have an embossing surface.

A pixel electrode 118 is formed in the reflection area that overlaps with the first horizontal area H1 and in the transmission area that overlaps with the second horizontal area H2, to be exposed. Specifically, the pixel electrode 118 formed on the organic insulating film 154 in the reflection area projects to overlap both sides of the data line 104, but on the other hand, the pixel electrode 118 formed to go through the transmission hole 170 in the transmission area is separate from both sides of the data line 104. For example, the pixel electrode 118 formed at each pixel area has an "I" shape. Accordingly, it is possible to reduce the parasitic capacitance caused by the overlapping of the data line 104 and the pixel electrode 118. The pixel electrode 118 goes along the side surface of the transmission hole 170 to be connected to the side surface of the drain electrode 112. The pixel electrode 118 generates a potential difference with a common electrode of the color filter substrate (not shown) using a pixel signal supplied through the thin film transistor 106. The liquid crystal having dielectric anisotropy rotates due to the potential difference to control the transmittance of light passing through the liquid crystal layer of each of the reflection area and the transmission area, thus the brightness is changed in accordance with a video signal.

The reflection electrode 156 is formed to overlap the pixel electrode 118 in the reflection area that overlaps with the first horizontal area H1, in order to reflect external light. The reflection electrode 156 is divided into upper and lower areas with the pixel electrode 118 formed in the transmission area therebetween. Accordingly, the reflection electrode 156 overlaps both sides of the data line 104 in the first horizontal area H1, but on the other hand, the reflection electrode 156 does not overlap the data line 104 in the second horizontal area H2. As a result, it is possible to reduce the parasitic capacitance caused by the data line 104 overlapping the reflection electrode 156 connected to the pixel electrode 118. The reflection electrode 156 has the embossed shape along the surface of the organic insulating film 154 together with the pixel electrode 118, thereby increasing the reflection efficiency by a scattering effect.

The transflective thin film transistor substrate shown in FIGS. 2 and 3 further includes a shield pattern 158 for preventing light leakage from passing by both sides of the data line 104 because of absence of the reflection electrode 156 in the second horizontal area H2. The shield pattern 158 overlaps both sides of the data line 104 in the second horizontal area H2 and overlaps one side of the pixel electrode 118 that is adjacent to the data line 104. Accordingly, the shield pattern 158 acts as a black matrix, thus the light leakage may be blocked without having a separate black matrix in the color filter substrate. Accordingly, it is possible to prevent the deterioration of contrast caused by the light leakage.

Further, the transflective thin film transistor substrate shown in FIGS. 2 and 3 further includes a storage capacitor 120 connected to the drain electrode 112 for stably maintaining the video signal supplied to the pixel electrode 118. To this end, the storage line 122 parallel to the gate line 102 is further formed in the reflection area. Accordingly, the storage capacitor 120 is formed by the extended drain electrode 112 overlaping the storage line 122 with the gate insulating film 144 therebetween.

In the transflective thin film transistor substrate according to the first embodiment of the present invention, the organic insulating film 154 is only formed in the first horizontal area H1 having the reflection area and the organic insulating film 154 and not in the second horizontal area H2 having the transmission area, thus it is possible to compensate for the different light path lengths of the liquid crystal in the reflection area and in the transmission area. In other words, the liquid crystal display panel, where the transflective thin film transistor substrate shown in FIGS. 2 and 3 is bonded to the color filter substrate with the liquid crystal therebetween, has a double cell gap in the first horizontal area H1 where the organic insulating film 154 is present and the second horizontal area H2 where the organic insulating film 154 is not present, wherein the cell gap of the reflection area is different from that of the transmission area. When an alignment film is formed on the transflective thin film transistor substrate and then is rubbed in a horizontal direction, it is possible to prevent the light leakage by preventing a rubbing defect caused by the stepped difference between the reflection area and the transmission area. Herein, the double cell gap formed in the first and second area H1, H2 is identical along the rubbing direction of the alignment film, i.e., along the horizontal direction.

The pixel electrode 118 formed in the transmission area is separated from the data line 104, and the reflection electrode 156 is not present in the second horizontal area H2 having the transmission area, thus it is possible to reduce the parasitic capacitance caused by the pixel electrode 118 and the reflection electrode 156 overlapping the data line 104. Accordingly, it is possible to reduce the vertical cross talk and the electric power consumption caused by the parasitic capacitance.

The transflective thin film transistor substrate according to an embodiment of the present invention with such a configuration is formed by five mask processes as follows.

Figure 4B:
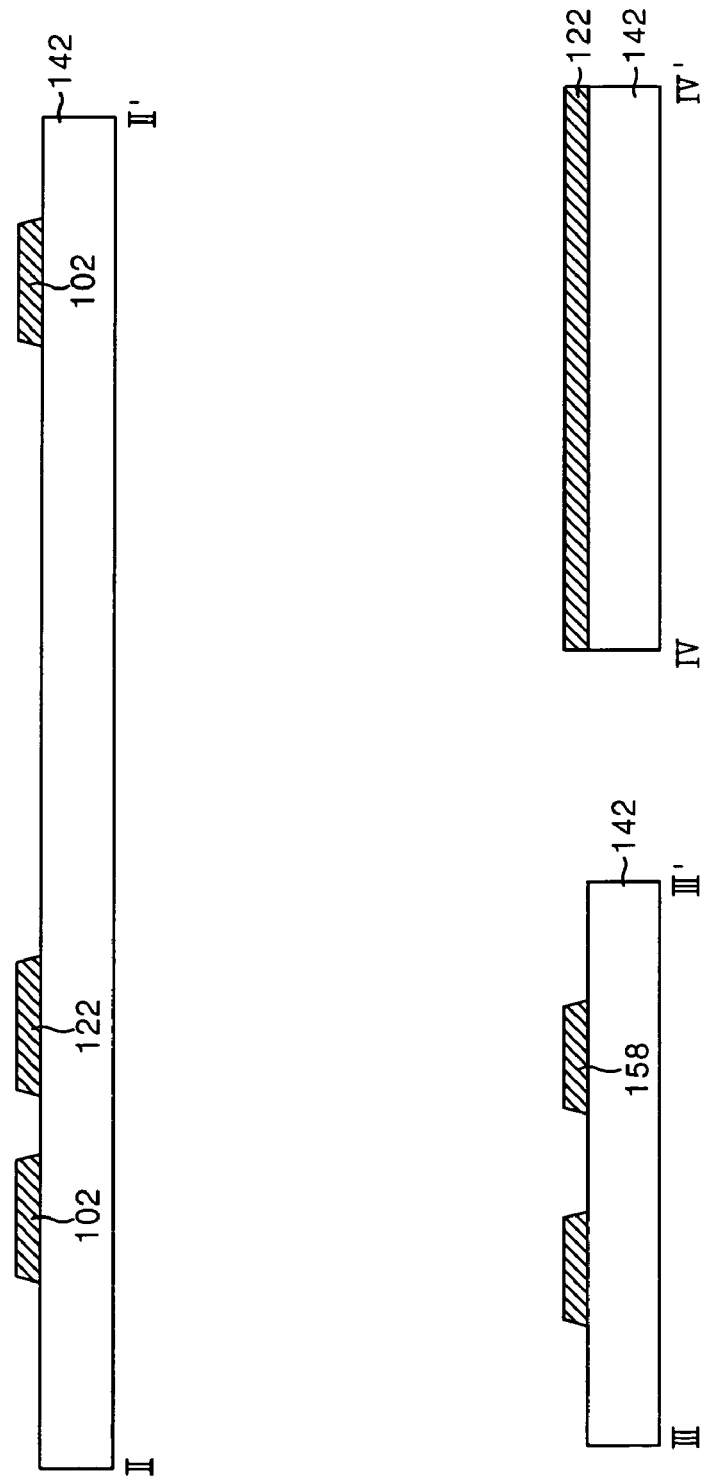

FIGS. 4A and 4B illustrate a plan view and a cross sectional view for explaining a first mask process in a fabricating method of a transflective thin film transistor substrate according to an embodiment of the present invention.

A gate metal pattern having the gate line 102, the storage line 122, and the shield pattern 158 are formed on the lower substrate 142 by a first mask process.

Specifically, a gate metal layer may be formed on the lower substrate 142 by a deposition method such as sputtering. The gate metal layer may be formed in a single layer of a metal material such Mo, Ti, Cu, AlNd, Al, Cr, Mo alloy, Cu alloy, Al alloy, etc, or in a structure where two or more layers are deposited such as Al/Cr, Al/Mo, Al(Nd)/Al, Al(Nd)/Cr, Mo/Al(Nd)Mo, Cu/Mo, Ti/Al(Nd)/Ti, Mo/Al, Mo/Ti/Al(Nd), Cu alloy/Mo, Cu alloy/Al, Cu alloy/Mo alloy, Cu alloy/Al alloy, Al/Mo alloy, Mo alloy/Al, Al alloy/Mo alloy, Mo alloy/Al alloy, Mo/Al alloy, etc. Subsequently, the gate metal layer is patterned by a photolithography process and an etching process using a first mask, thereby forming the gate metal pattern having the gate line 102, the storage line 122, and the shield pattern 158.

Figure 5A:
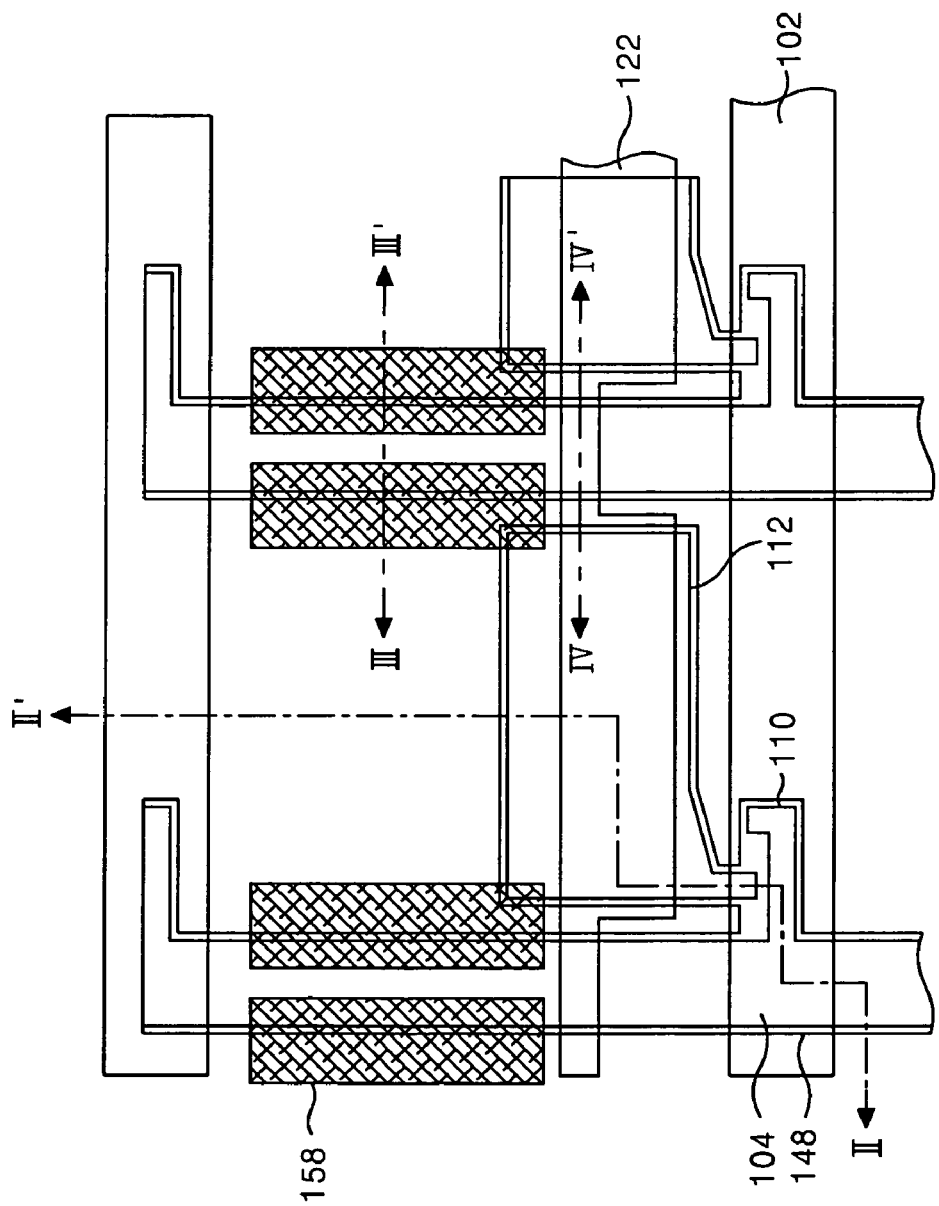

FIGS. 5A and 5B illustrate a plan view and a sectional view for explaining a second mask process in the fabricating method of the transflective thin film transistor substrate according to an embodiment of the present invention.

A gate insulating film 144 is formed on the lower substrate 142 where the gate metal pattern is formed. A source/drain metal pattern having the data line 104, the source electrode 110 and the drain electrode 112, and a semiconductor pattern 148 having the active layer 116 and the ohmic contact layer 146 that overlap along and under the source/drain metal pattern are formed thereon by a second mask process. The semiconductor pattern 148 and the source/drain pattern may be formed by one mask process using a diffractive exposure mask or halftone mask. Hereinafter, only the case of using the diffractive exposure mask is described as an example.

Specifically, the gate insulating film 144, an amorphous silicon layer, an amorphous silicon layer doped with impurities (n+ or p+), and a source/drain metal layer are sequentially formed on the lower substrate 142 where the gate pattern is formed. For example, the gate insulating film 144, the amorphous silicon layer, and the amorphous silicon layer doped with impurities (n+ or p+) may be formed by a PECVD method, and the source/drain metal layer may be formed by a sputtering method. The gate insulating film 144 may be formed of an inorganic insulating material such as silicon oxide SiOx, silicon nitride SiNx, etc. The source/drain metal layer may be formed in a single layer of a metal material such as Mo, Ti, Cu, AlNd, Al, Cr, Mo alloy, Cu alloy, Al alloy, etc, or in a structure where two or more layers may be deposited such as Al/Cr, Al/Mo, Al(Nd)/Al, Al(Nd)/Cr, Mo/Al(Nd)Mo, Cu/Mo, Ti/Al(Nd)/Ti, Mo/Al, Mo/Ti/Al(Nd), Cu alloy/Mo, Cu alloy/Al, Cu alloy/Mo alloy, Cu alloy/Al alloy, Al/Mo alloy, Mo alloy/Al, Al alloy/Mo alloy, Mo alloy/Al alloy, Mo/Al alloy, etc.

A photo-resist pattern having a step difference is formed on the source/drain metal layer by the photolithography process using a diffractive exposure mask. The photo-resist pattern is formed to be relatively thicker in an area where the semiconductor pattern and the source/drain pattern are to be formed, and to be relatively thinner in an area where a channel of the thin film transistor is to be formed.

The source/drain metal pattern having the data line 104 and the drain electrode 112 integrated with the source electrode 110, and the semiconductor pattern 148 thereunder are formed by an etching process using the photo-resist pattern that has such a step difference. Herein, the drain electrode 112 overlaps the storage line 122 together with the semiconductor pattern 148 with the gate insulating film 144 therebetween to form the storage capacitor 120.

Then, a thin part of the photo-resist pattern is removed and a thick part thereof becomes thin by an ashing process. The source electrode 110 and the drain electrode 112 are separated by the etching process using the ashed photo-resist pattern, and the ohmic contact layer 146 thereunder is removed. Subsequently, the photo-resist pattern remaining on the source/drain metal pattern is removed by a stripping process.

Figure 6A:
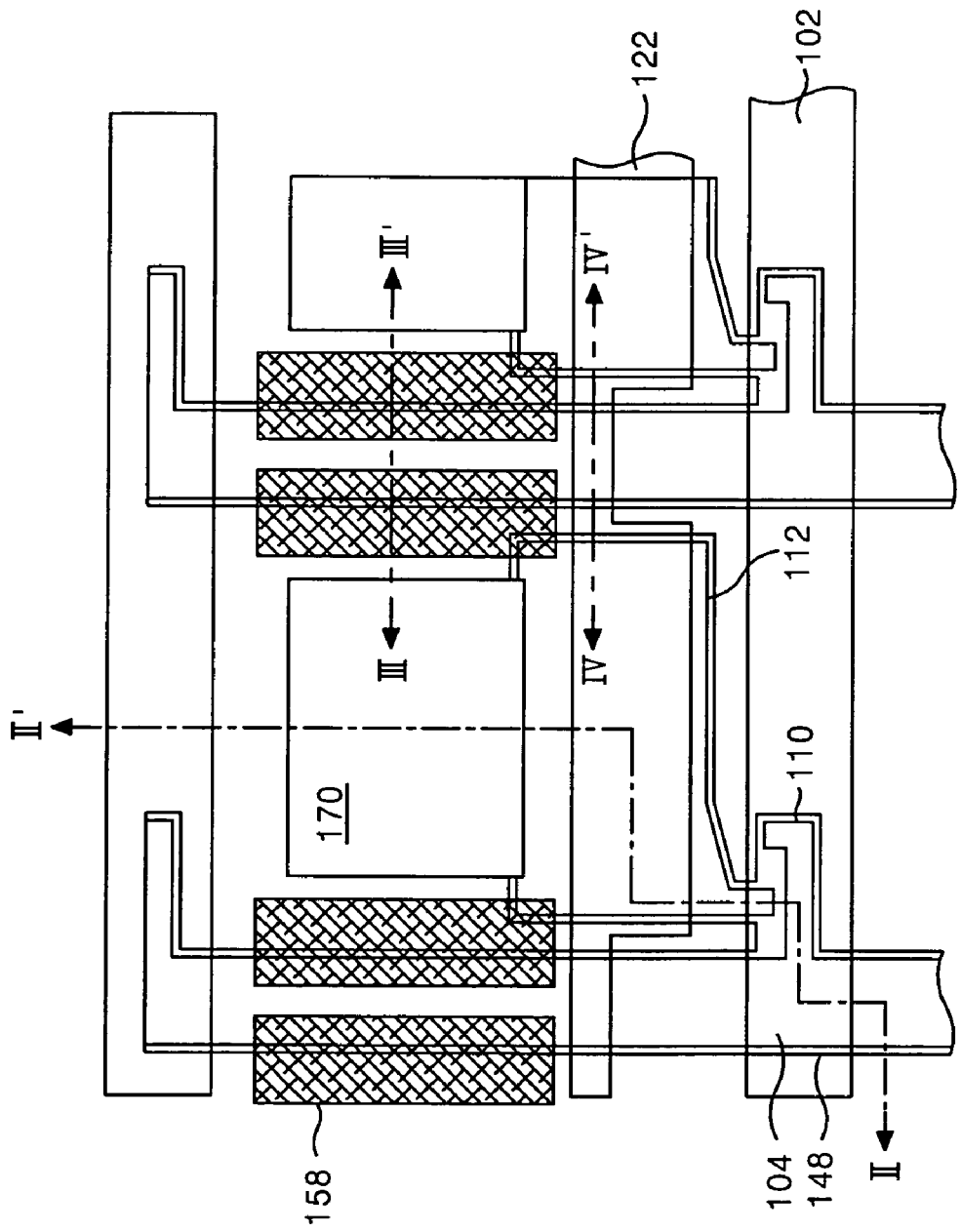

FIGS. 6A and 6B are a plan view and a cross sectional view for explaining a third mask process in the fabricating method of the transflective thin film transistor according to an embodiment of the present invention.

A passivation film 150 which covers the source/drain metal pattern and has a transmission hole 170 within the pixel area is formed by a third mask process.

Specifically, the passivation film 150 is formed on the gate insulating film 144 where the source/drain metal pattern is formed, by a deposition method such as PECVD, etc. The passivation film 150 is formed of an inorganic insulating material like the gate insulating film 144. Subsequently, the passivation film 150 and the gate insulating film 144 are patterned by the photolithography process and the etching process using a third mask, thereby forming the transmission hole 170 that penetrates the passivation film 150 and the gate insulating film 144. The transmission hole 170 exposes the side surface of the drain electrode 112 and the semiconductor pattern formed thereunder.

Figure 7A:
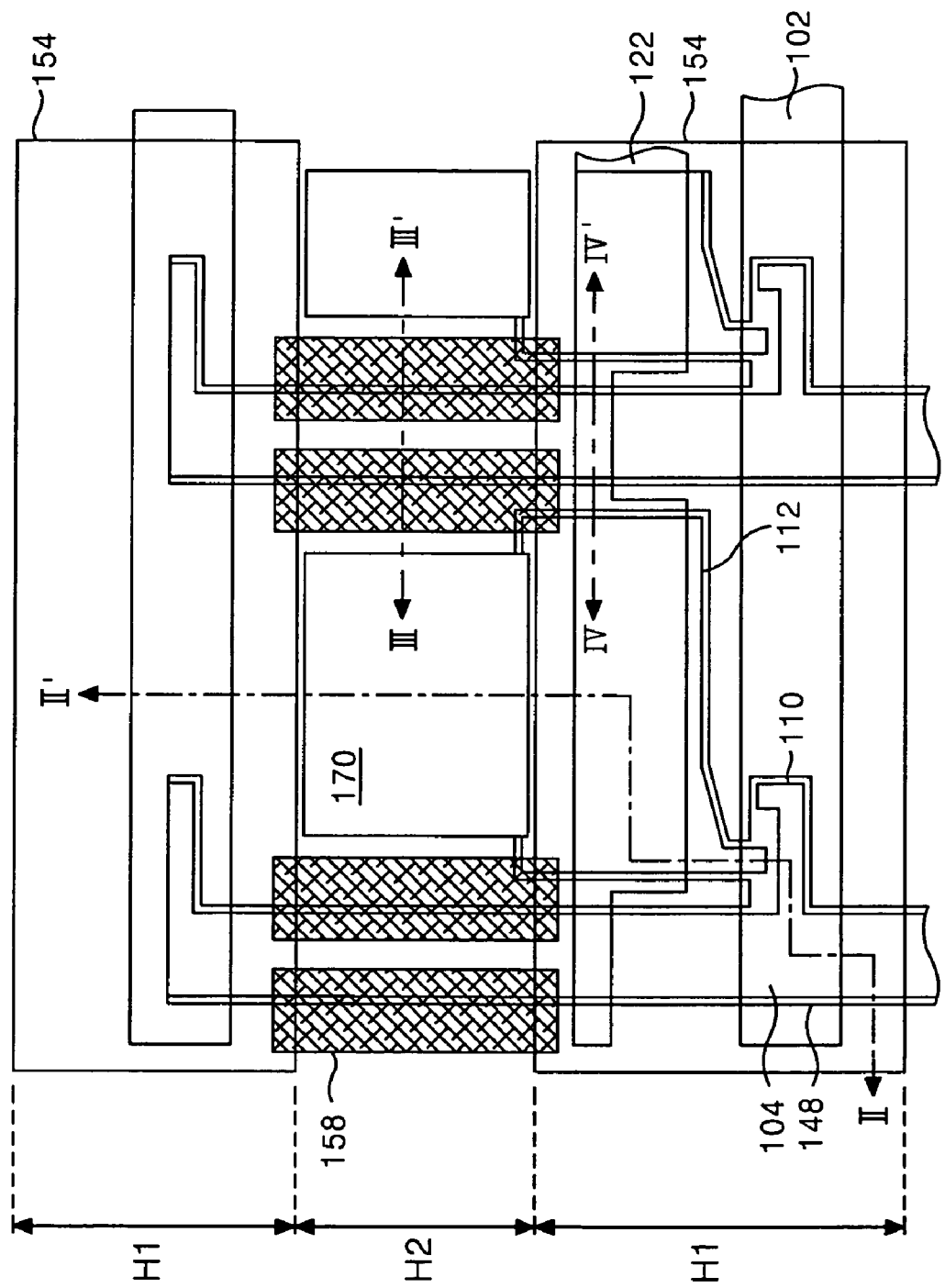
FIGS. 7A and 7B are a plan view and a cross sectional view for explaining a fourth mask process of the transflective thin film transistor substrate according to the embodiment of the present invention.
Figure 7B:
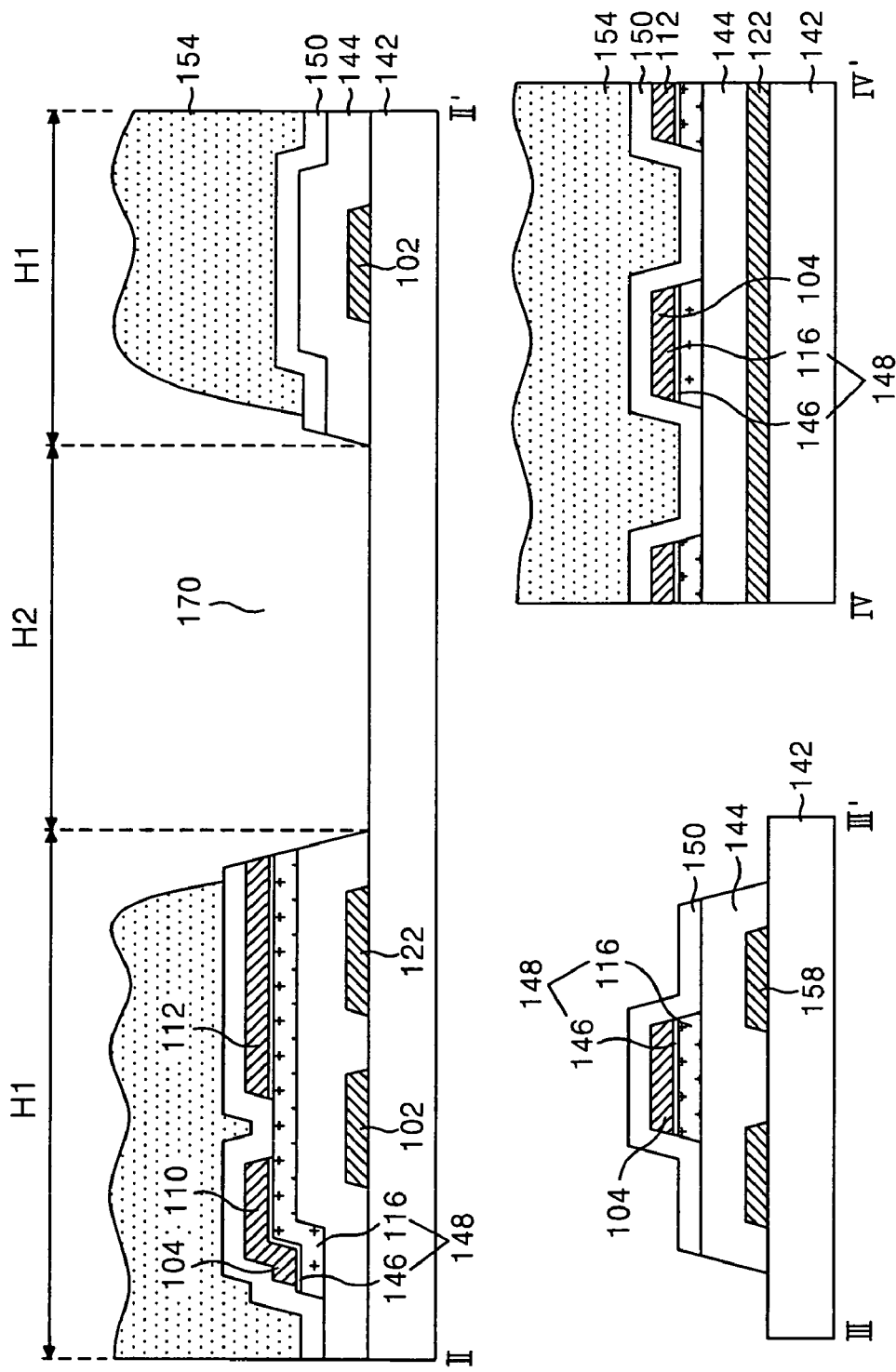

FIGS. 7A and 7B illustrate a plan view and a cross sectional view for explaining a fourth mask process in the fabricating method of the transflective thin film transistor according to an embodiment of the present invention.

An organic insulating film 154 having an embossed surface is formed on the passivation film 150 of the first horizontal area H1 that is separated from the second horizontal area H2 that goes through the transmission hole 170, therebetween by a fourth mask process.

Specifically, the organic insulating film 154 may be formed by coating the passivation film 150 with a photosensitive organic material such as photo acryl by a spin coating method, a spinless coating method, etc. Then, the organic insulating film is patterned by the photolithography process using a fourth mask, thereby removing the organic insulating film 154 in the second horizontal area H2 which goes through the transmission hole corresponding to the transmission part of the fourth mask. Further, an area outside the transmission part of the fourth mask has a structure having a shielding part and a diffractive exposure part (or transflective part) repeated, and as a result, the organic insulating film 154 is patterned in a structure where a shielding area (projected part) and a diffractive exposure area (groove part) having a repeated step difference in the first horizontal area. Subsequently, the organic insulating film 154 where the projected part and the groove part are repeated is baked, thereby the organic insulating film 154 formed in the first horizontal area H1 has an embossed shape on its surface.

Figure 8A:
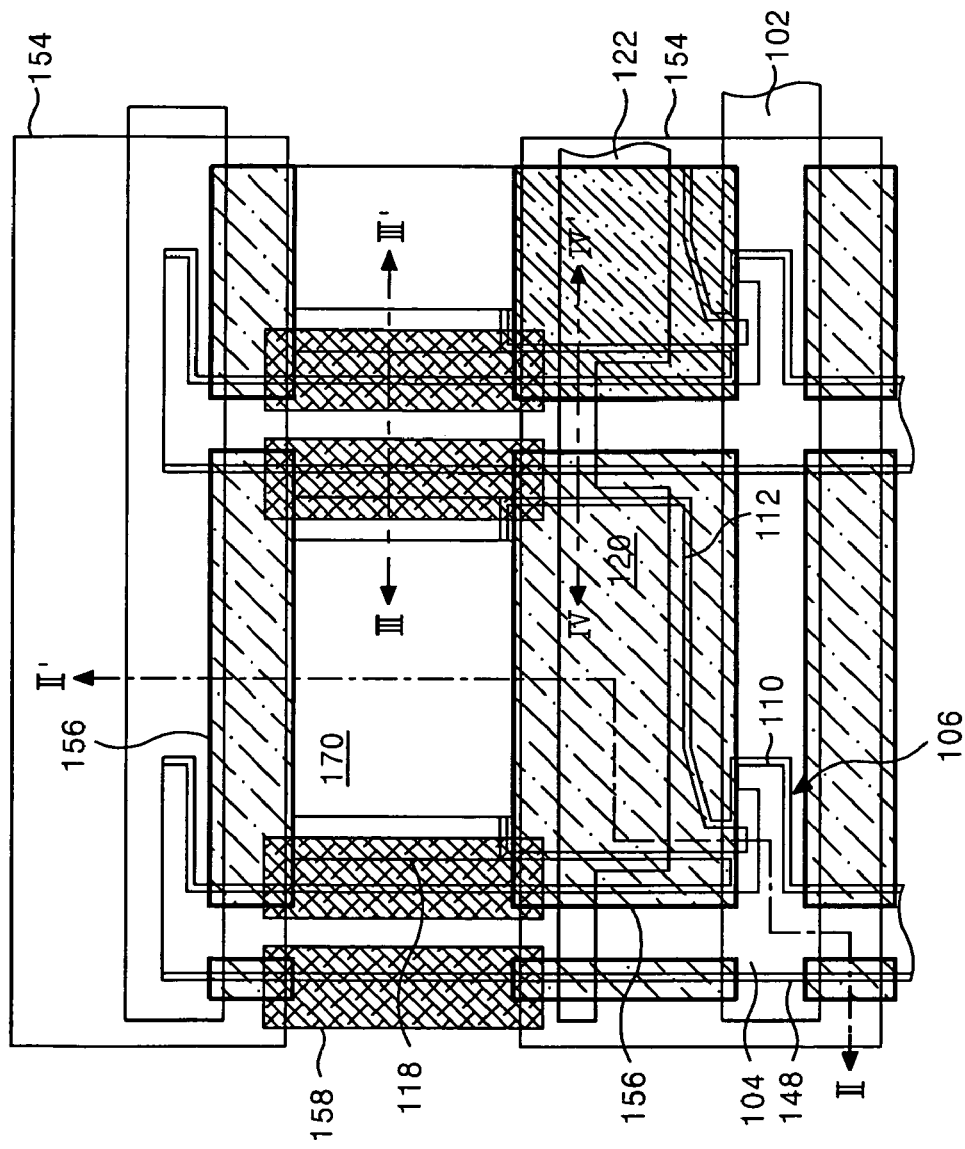
FIGS. 8A and 8B are a plan view and a cross sectional view for explaining a fifth mask process of the transflective thin film transistor substrate according to the embodiment of the present invention.
Figure 8B:
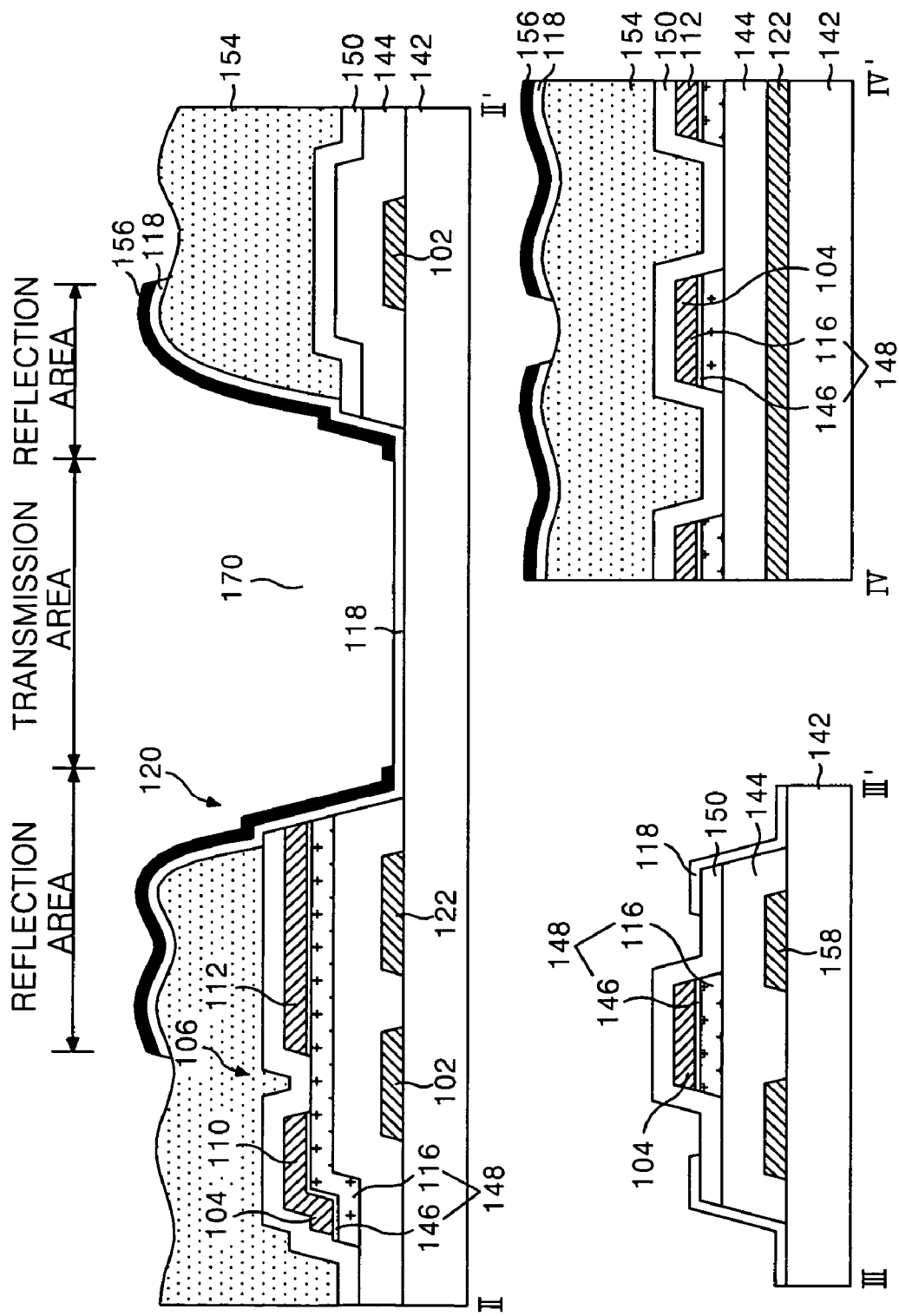

FIGS. 8A and 8B illustrate a plan view and a cross sectional view for explaining a fifth mask process in the fabricating method of the transflective thin film transistor according to an embodiment of the present invention. FIGS. 9A to 9F illustrate sectional diagrams for specifically explaining the fifth mask process of the present invention.

The pixel electrode 118 is formed over the reflection area where the organic insulating film 154 and the transmission area that goes through the transmission hole 170, and the reflection electrode 156 that overlaps the pixel electrode 118 in the reflection area is formed. The pixel electrode 118 and the reflection electrode 156 may be formed by using a diffractive exposure mask, a halftone mask, or a partial transmission mask, but hereinafter, only the halftone mask will be used as an example in the explanation of the process.

Figure 9A:
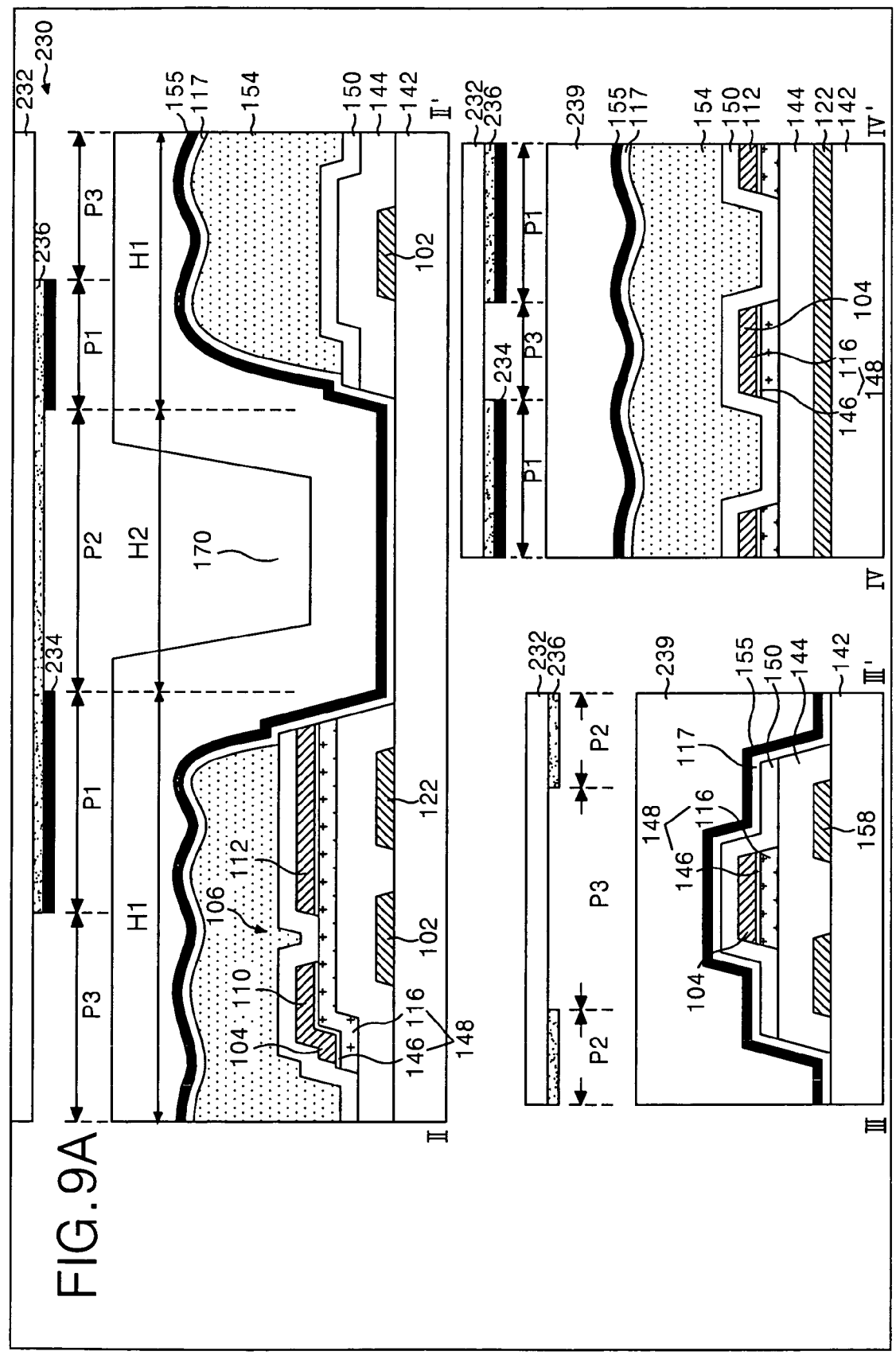
FIGS. 9A and 9F are cross sectional views for specifically explaining the fourth mask process of the transflective thin film transistor substrate using a halftone mask.
Figure 9B:
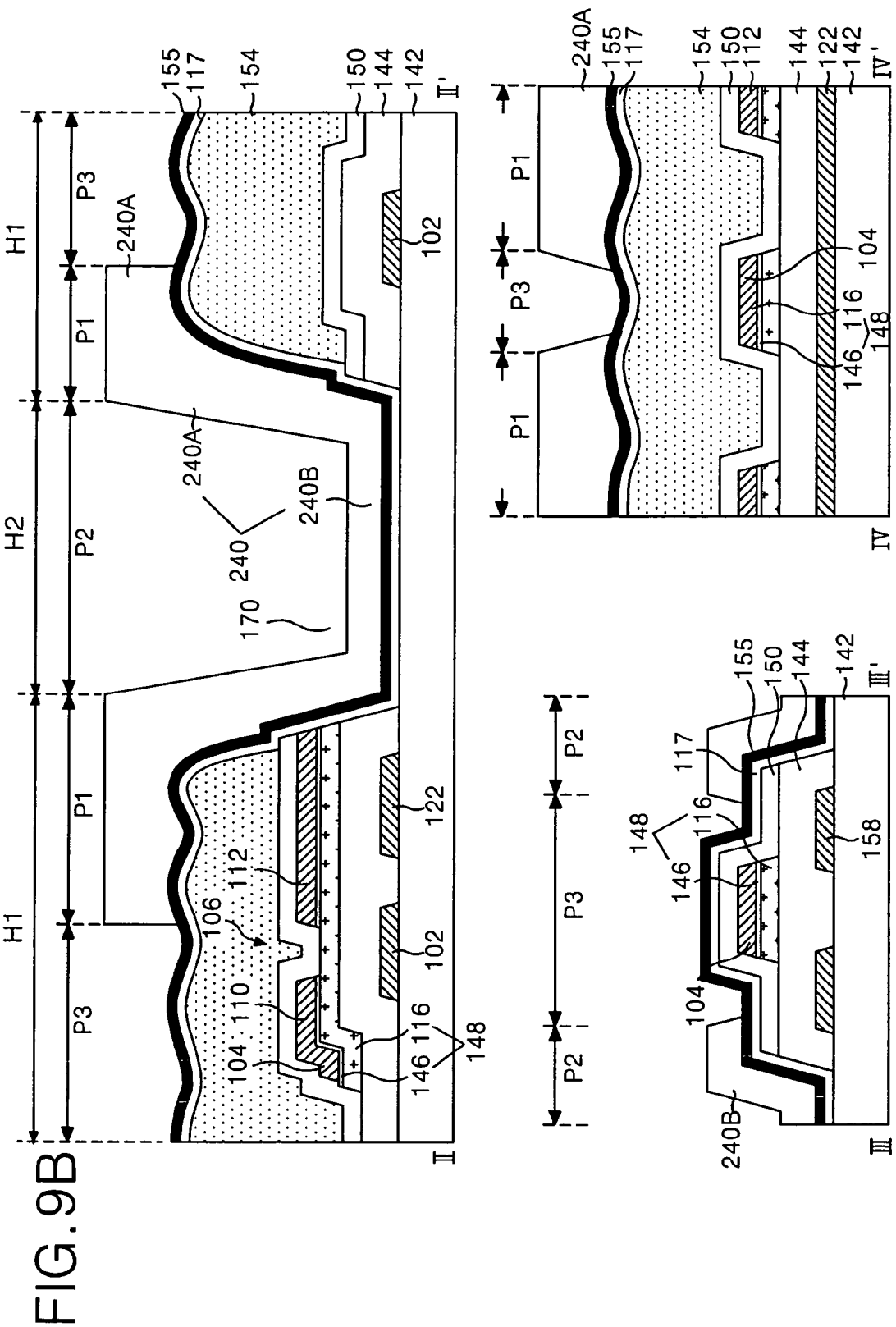

Referring to FIG. 9A, a transparent conductive film 117 and a reflective metal layer 155 covering the first and second horizontal areas H1, H2 are deposited by a deposition method such as sputtering, etc. The transparent conductive film 117 may be formed of ITO, TO, IZO, ITZO, etc, and the reflective metal layer 155 may be formed of a metal with high reflectability, such as Al, Al alloy like AlNd, etc, or formed in a double layer structure such as AlNd/Mo, etc. Subsequently, a photo-resist 239 is formed on the reflective metal layer 155 and then is exposed and developed by the photolithography process using a halftone mask 230, thereby forming a photo-resist pattern 240 which has a step difference, as shown in FIG. 9B.

Specifically, the halftone mask 230 includes a transparent quartz substrate 232 and a halftone transmission layer 236 and a shielding layer 234 which are formed thereon. The shielding layer 234 may be formed of a metal such as Cr, CrOx, etc, and the halftone transmission layer 236 may be formed of MoSix, etc. Herein, a shielding area P1 includes the halftone transmission layer 236 and the shielding layer 234 that intercepts ultraviolet rays UV, thus a first photo-resist pattern 240A remains in an area where the reflective metal layer 155 and the transparent conductive film 117 should remain as shown in FIG. 9B. A partial transmission area P2 includes the halftone transmission layer 236 that partially transmits the ultraviolet rays UV, thus a second photo-resist pattern 240B thinner than the first photo-resist pattern 240A remains in an area where only the transparent conductive film 117 should remain as shown in FIG. 9B. A full transmission area P3 where the quartz substrate 232 is exposed transmits all the ultraviolet rays UV, thus the photo-resist pattern 240 should not remain in an area where the reflective metal layer 155 and the transparent conductive film 117 should be removed as shown in FIG. 9B. The first photo-resist pattern 240A is formed in the first horizontal area H1 where the organic insulating film 154 is present and the second photo-resist pattern 240B is formed in the second horizontal area H2 where the organic insulating film 154 is not present.

Referring to FIG. 9C, the reflective metal layer 155 and the transparent conductive film 117 are patterned by the etching process, e.g., wet etching process, using the photo-resist pattern 240 as a mask, thereby forming the pixel electrode 118 and the reflection electrode 156 overlapped thereon. The pixel electrode 118 and the reflection electrode 156 are formed to overlap both sides of the data line 104 in the reflection area where the organic insulating film 154 is present, but on the other hand, the pixel electrode 118 and the reflection electrode 156 are separated from the data line 104 on both sides in the second horizontal area H2. For example, the pixel electrode 118 and the reflection electrode 156 are formed in an "I" shape. The surface of the organic insulating film 154 has an embossed shape, thus the pixel electrode 118 and the reflection electrode 156 located in the reflection area also have the embossed shape.

Referring to FIG. 9D, the first photo-resist pattern 240A becomes thinner and the second photo-resist pattern 240B is removed by an ashing process.

Referring to FIG. 9E, the exposed reflection electrode 156 is etched by a wet etching process using the ashed first photo-resist pattern 240A, thereby removing the reflection electrode 156 and the pixel electrode 118 is exposed in the second horizontal area H2.

Figure 9F:
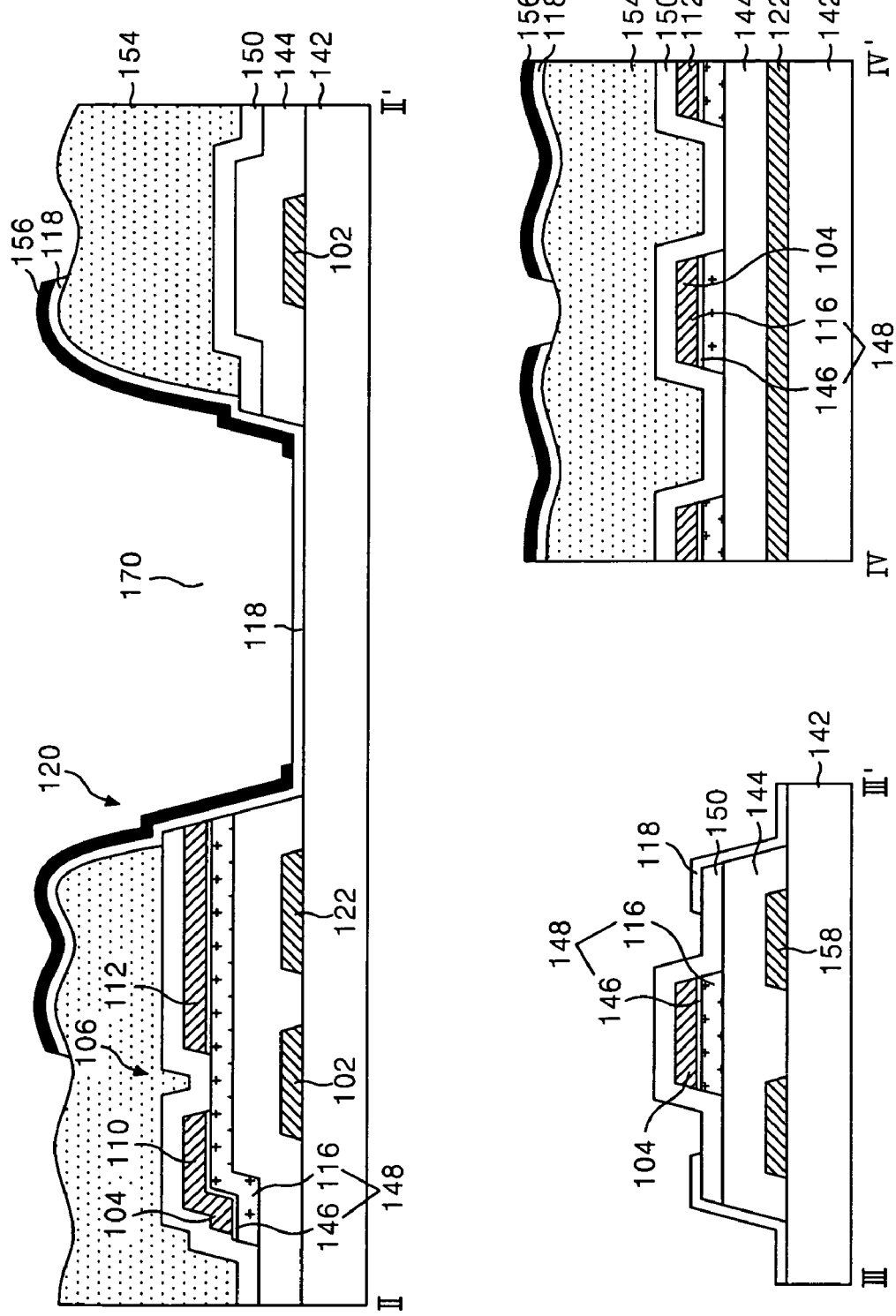

Referring to FIG. 9F, the first photo-resist pattern 240A remaining behind on the reflection electrode 156 in FIG. 9E is removed by a stripping process.

In this way, the fabricating method of the transflective thin film transistor substrate according to the first embodiment of the present invention is performed by the five mask processes, thus the process may be simplified. An alignment film is formed on the transflective thin film transistor substrate, and then, the alignment film is rubbed in the same direction as the horizontal direction in which the organic insulating film 154 is formed. Accordingly, it is possible to prevent a rubbing defect caused by the step difference of the reflection area and the transmission area.

Further, the transflective thin film transistor substrate of the present invention is bonded to the color filter substrate with the liquid crystal therebetween, thereby forming the transflective type liquid crystal display panel. Accordingly, the transflective type liquid crystal display panel according to the present invention has a double cell gap, wherein the cell gap in the first horizontal area H1 where the organic insulating film 154 is formed is different from the cell gap in the second horizontal area H2 where the organic insulating film 154 is removed. In this way, the double cell gap respectively formed in the first and second horizontal areas H1, H2 become identical along the rubbing direction of the transflective thin film transistor substrate.

Figure 10A:
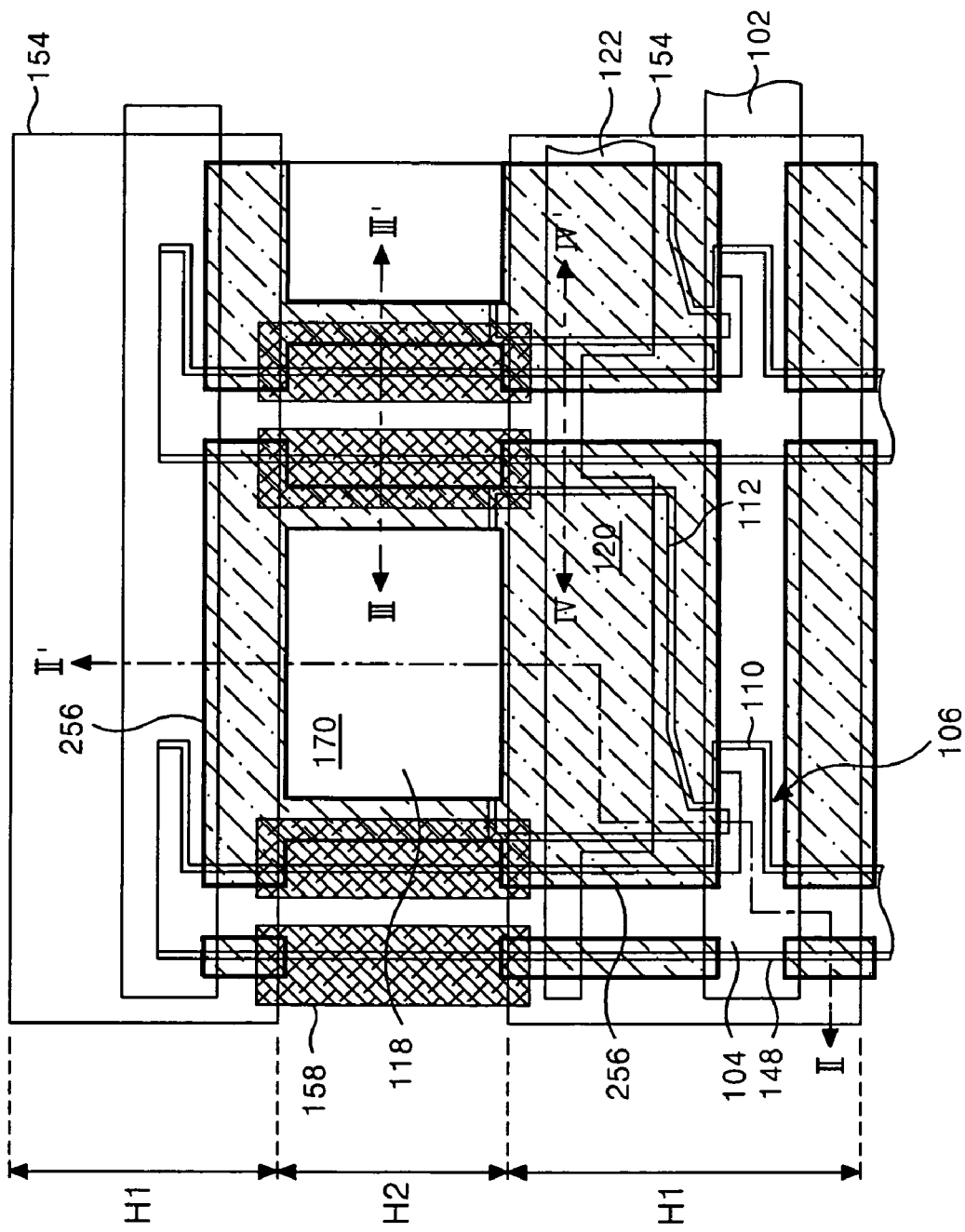

FIG. 10A is a plan view illustrating a part of a transflective thin film transistor substrate according to a second embodiment of the present invention, and FIG. 10B is a cross sectional view illustrating the transflective thin film transistor substrate shown in FIG. 10A, taken along the lines II-II', III-III', and IV-IV'.

The transflective thin film transistor substrate shown in FIGS. 10A and 10B includes the same components as the thin film transistor substrate shown in FIGS. 2 and 3 except that a reflection electrode 256 overlaps the both sides of the pixel electrode 118 in the second horizontal area H2, and is formed by the foregoing five mask processes. Accordingly, a detail description for the repeated components will be omitted.

The reflection electrode 256 overlaps the pixel electrode 118 in the reflection area of the first horizontal area H1 where the organic insulating film 154 is present and overlaps both sides of the pixel electrode 118 that is separated from the data line 104 in the second horizontal area H2. Accordingly, the reflection electrode 256 encompasses the transmission area where the pixel electrode 118 is exposed. The reflection electrode 156 and the pixel electrode 118 are separated from the data line 104 in the second horizontal area H2, thus the parasitic capacitance is decreased to make it possible to reduce the vertical cross talk and the electric power consumption. In this case, the shield pattern 158 overlaps with both sides of the data line 104 in the second horizontal area H2 and also overlaps with one side of the reflection electrode 256 and the pixel electrode 118.

Figure 11A:
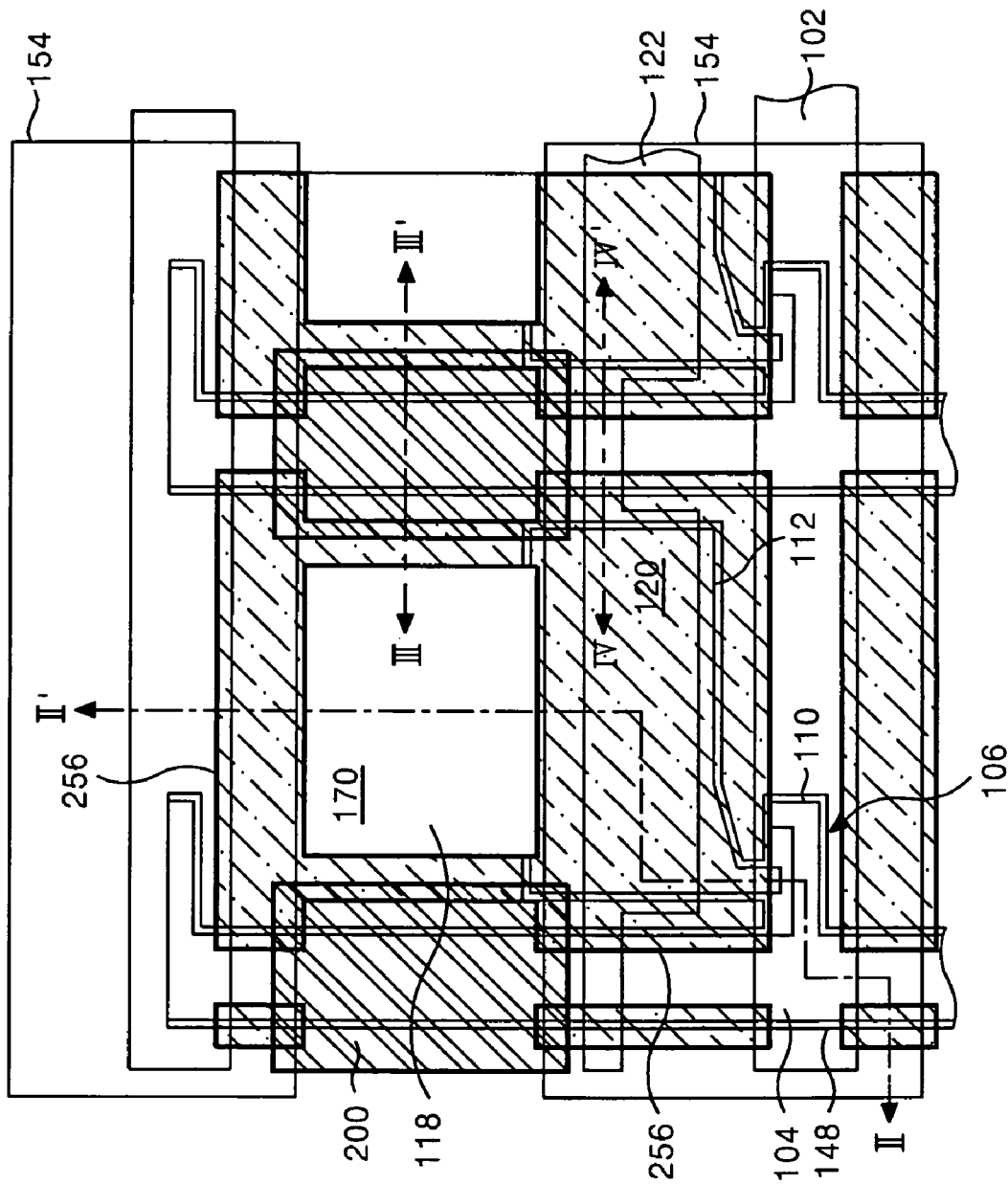

FIG. 11A is a plan view illustrating a black matrix of a transflective thin film transistor substrate according to a third embodiment of the present invention, and FIG. 11B is a cross sectional view illustrating the transflective thin film transistor substrate and the black matrix shown in FIG. 11A, taken along the lines II-II', III-III', and IV-IV'.

The transflective thin film transistor substrate shown in FIGS. 11A and 11B includes the same components as the transflective thin film transistor substrate shown in FIGS. 10A and 10B except that a black matrix 200 is further formed on the color filter substrate instead of the shield pattern 158 and is formed by the foregoing five mask processes. Accordingly, a detailed description of the repeated components will be omitted.

The pixel electrode 118 and the reflection electrode 256 are separate from both sides of the data line 104 in order to reduce the parasitic capacitance in the second horizontal area H2 in the transmission area where the pixel electrode 118 is exposed. In order to block the light leakage around both sides of the data line 104, the black matrix 200 is further formed on the color filter substrate (not shown). The black matrix 200 is formed to encompass the data line 104 in the second horizontal area H2 and to overlap one side of the reflection electrode 256 and the pixel electrode 118. Accordingly, it is possible to prevent the deterioration of contrast caused by the light leakage.

As described above, the transflective thin film transistor substrate and the fabricating method thereof according to the present invention may simplify the process to the five mask processes. Accordingly, the transflective type liquid crystal display panel and the fabricating method thereof using the transflective thin film transistor substrate and the fabricating method thereof according to the present invention may reduce material cost, equipment investment cost, etc. and improve yield.

Further, the transflective thin film transistor substrate and the fabricating method thereof according to the present invention produces the organic insulating film formed in the first horizontal area H1 that goes through the reflection area and not formed in the second horizontal area H2 which goes through the transmission area. Accordingly, when rubbing the alignment film in the horizontal direction after forming the alignment film over the transflective thin film transistor substrate, it is possible to prevent the rubbing defect caused by the step difference of the reflection area and the transmission area. Accordingly, the transflective thin film transistor substrate and the fabricating method thereof according to the present invention prevents the light leakage caused by the rubbing defect, thereby making it possible to improve the contrast ratio.

Further, in the transflective thin film transistor substrate and the fabricating method thereof according to the present invention, the pixel electrode overlaps the data line of both sides in the reflection area, but on the other hand, the pixel electrode is separated from the data line in the second horizontal area H2 having the transmission area, thereby reducing the parasitic capacitance between the pixel electrode and the data line.

In addition, in the transflective thin film transistor substrate and the fabricating method thereof according to the present invention, the reflection electrode overlaps the pixel electrode in the reflection area to overlap both sides of the data line, but on the other hand, the reflection electrode is removed in the second horizontal area H2 having the transmission area or is formed to overlap both sides of the pixel electrode that is separate from the data line, thereby making it possible to reduce the parasitic capacitance between the pixel electrode and the reflection electrode.

Accordingly, it is possible to reduce the vertical cross talk and the electric power consumption caused by the parasitic capacitance.

Further, the transflective thin film transistor substrate and the fabricating method thereof according to the present invention further includes the shield pattern or black matrix for blocking the light leakage around both sides of the data line in the second horizontal area, thereby blocking the light leakage to make it possible to improve the contrast ratio.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates having a reflection area and a transmission area;
   a liquid crystal layer formed in a cell gap between the first and second substrates;
   a gate line and a data line crossing each other with a gate insulating film in between to define a pixel area on the first substrate;
   a thin film transistor connected to the gate line and the data line;
   a pixel electrode in the pixel area connected to the thin film transistor and having the transmission area;
   a reflection electrode formed in the reflection area having upper and lower areas with the transmission area in between, wherein the refection electrode overlaps the pixel electrode in the pixel;
   an organic insulating film formed under the reflection electrode and formed in a first horizontal area including the reflection area across the data line, wherein the organic insulating film is removed in a second horizontal area including the transmission area across the data line, wherein the first horizontal area is separated with the second horizontal area in between; and
   an alignment film on an uppermost layer rubbed in a horizontal direction,
   wherein the reflection electrode and the organic insulating film has an embossed surface and wherein the first and second substrates have a first cell gap in the first horizontal area where the organic insulating film is formed and a second cell gap different with the first cell gap in the second horizontal area where the organic insulating film is removed.

2. The device according to claim 1, wherein the reflection electrode overlaps the data line at both sides of the pixel area in the reflection area and wherein the pixel electrode is horizontally separated from both sides of the data line in the second horizontal area.

3. The device according to claim 2, wherein the reflection electrode further has overlapping areas which overlap both sides of the pixel electrode in the second horizontal area to encompass the transmission area.

4. The device according to claim 1, further including:
a storage line formed substantially parallel to the gate line in the first horizontal area; and
a storage capacitor including a drain electrode extended from the thin film transistor overlapping with the storage line with the gate insulating film in between.

5. The device according to claim 1, further including:
a passivation film between the thin film transistor and an organic insulating film, and
wherein a side surface of a drain electrode is exposed through a transmission hole that penetrates the passivation film and the gate insulating film, and the drain electrode is connected to the pixel electrode through the transmission hole.

6. The device according to claim 2, further including:
shield patterns overlapping both sides of the data line in the second horizontal area, wherein each of the shield patterns overlaps one side of the pixel electrode separated from the data line.

7. The device according to claim 1, further including:
black matrix on the second substrate that overlaps the data line and one side of the pixel electrode in the second horizontal area.

8. A method of fabricating a liquid crystal display device, comprising:
forming a gate line on a first substrate crossing a data line with a gate insulating film in between to define a pixel area, and a thin film transistor connected to the gate line and the data line on a first substrate;
forming an organic insulating film in first horizontal areas across the data line on the first substrate and removing in a second horizontal area between the first horizontal areas;
forming a pixel electrode, having a transmission area in the second horizontal area, connected to the thin film transistor and overlapping a part of the organic insulating film in the first horizontal area
forming a reflection electrode in the first horizontal area overlapping the pixel electrode on the organic insulating film,
forming an alignment film on an uppermost layer and rubbing in a horizontal direction, and
bonding the first substrate and a second substrate together with a liquid crystal layer in between,
wherein the reflection electrode and the organic insulating film has an embossed surface and
wherein the first and second substrates have a first cell gap in the first horizontal area where the organic insulating film is formed and a second cell gap different with the first cell gap in the second horizontal area where the organic insulating film is removed.

9. The method according to claim 8, wherein the reflection electrode and the pixel electrode overlap the data line at both sides of the pixel area in the reflection area, wherein the pixel electrode is horizontally separated from the data line at both sides in the second horizontal area.

10. The method according to claim 8, further including:
forming shield patterns overlapping both sides of the data line in the second horizontal area when forming the gate line, wherein each of the shield patterns overlaps one side of the pixel electrode separated from the data line.

11. The method according to claim 10, wherein the reflection electrode further has overlapping areas which overlap both sides of the pixel electrode in the second horizontal area.

12. The method according to claim 8, further including:
forming a storage line substantially parallel to the gate line in the first horizontal area; and
forming a storage capacitor including a drain electrode extended from the thin film transistor overlapping the storage line with the gate insulating film in between.

13. The method according to claim 8, further including:
forming a passivation film between the thin film transistor and an organic insulation film; and
forming a transmission hole penetrating the passivation film and the gate insulating film in the second horizontal area to expose a side surface of a drain electrode, and
wherein the pixel electrode is connected to the drain electrode through the transmission hole.

14. The method according to claim 8, wherein forming the pixel electrode and the reflection electrode includes:
forming a transparent conductive film and a reflective metal layer on the organic insulating film;
forming a photo-resist pattern having different thicknesses on the reflective metal layer;
forming the pixel electrode and the reflection electrode overlapped in the pixel electrode by patterning the transparent conductive film and the reflective metal layer by an etching process using the photo-resist pattern as a mask;
removing the reflection electrode overlapped with the pixel electrode in the second horizontal area between the first horizontal areas by an etching process using an ashed photo-resist pattern as a mask; and
removing the ashed photo-resist pattern.

15. The method according to claim 14, wherein the photo-resist pattern is formed by a photolithography process using one of a diffractive exposure mask, a halftone mask, and a partial exposure mask.

16. The method according to claim 8, further including:
providing the second substrate having a black matrix that overlaps the data line in the second horizontal area and overlaps one side of the pixel electrode.

17. A method of fabricating a liquid crystal display device, comprising:
forming a gate line on a first substrate;
forming a gate insulating film on the gate line, a semiconductor pattern on the gate insulating film, a data line on the semiconductor pattern to cross the gate line to define a pixel area, a source electrode connected to the data line, and a drain electrode facing the source electrode;
forming a passivation film on the data line, the source electrode, and the drain electrode and having a transmission hole exposing the drain electrode in the pixel area;
forming an organic insulating film in first horizontal areas separated by the transmission hole and removing in a second horizontal area between the first horizontal areas;
forming a pixel electrode that goes through the transmission hole and overlaps a part of the organic insulating film in the first horizontal area, wherein the pixel electrode has a transmission area in the second horizontal area and connected to the drain electrode, exposing through the transmission hole;

forming a reflection electrode that overlaps the pixel electrode on the organic insulating film in the first horizontal area and defines a reflection area forming an alignment film on an uppermost layer and rubbing in a horizontal direction, and bonding the first substrate and a second substrate together with a liquid crystal layer in between, wherein the reflection electrode and the organic insulating film has an embossed surface and wherein the first and second substrates have a first cell gap in the first horizontal area where the organic insulating film is formed and a second cell gap different with the first cell gap in the second horizontal area where the organic insulating film is removed.

18. The method according to claim 17, wherein the reflection electrode and the pixel electrode overlap the data line at both sides of the pixel area in the reflection area, wherein the pixel electrode is horizontally separated from the data line at both sides in the second horizontal area.

19. The method according to claim 18, further including:
forming shield patterns overlapping both sides of the data line in the second horizontal area when forming the gate line, wherein each of the shield patterns overlaps one side part of the pixel electrode separated from the data line.

20. The method according to claim 18, wherein the reflection electrode overlaps both sides of the pixel electrode separated from the data line in the second horizontal area.

21. The method according to claim 17, further including:
forming a storage line substantially parallel to the gate line in the first horizontal area; and forming a storage capacitor including a drain electrode extended from the thin film transistor overlapping the storage line with the gate insulating film in between.

22. The method according to claim 17, wherein forming the pixel electrode and the reflection electrode includes:
forming a transparent conductive film and a reflective metal layer on the organic insulating film;

forming a photo-resist pattern having different thicknesses on the reflective metal layer;

forming the pixel electrode and the reflection electrode overlapped on the pixel electrode by patterning the transparent conductive film and the reflective metal layer by an etching process using the photo-resist pattern as a mask;

removing the reflection electrode overlapped with the pixel electrode in the second horizontal area between the first horizontal areas by an etching process using an ashed photo-resist pattern as a mask; and removing the ashed photo-resist pattern.

23. The method according to claim 22, wherein the photo-resist pattern is formed by a photolithography process using one of a diffractive exposure mask, a halftone mask, and a partial exposure mask.

24. The method according to claim 17, further including:
providing the second substrate having a black matrix that overlaps the data line in the second horizontal area and overlaps one side of the pixel electrode.

* * * * *